(12) United States Patent
Henderson et al.

(10) Patent No.: US 6,810,725 B2
(45) Date of Patent: Nov. 2, 2004

(54) EXHAUST GAS RECIRCULATION MEASUREMENT DEVICE

(75) Inventors: Gregory H. Henderson, Columbus, IN (US); Michael J. Marthaler, Columbus, IN (US); Jeffrey J. Braun, Columbus, IN (US); Vinoo Thomas, Columbus, IN (US); Guangping Pan, Columbus, IN (US); Thomas L. McKinley, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 10/375,066

(22) Filed: Feb. 28, 2003

(65) Prior Publication Data

US 2004/0168508 A1 Sep. 2, 2004

(51) Int. Cl.[7] .............................................. G01M 19/00
(52) U.S. Cl. ...................................................... 73/118.1
(58) Field of Search ............................... 73/116, 117.1, 73/118.1, 118.2, 117.2, 117.3

(56) References Cited

U.S. PATENT DOCUMENTS

| | | |
|---|---|---|
| 3,910,113 A | 10/1975 | Brown |
| 4,403,514 A | 9/1983 | Osborn |
| 4,463,601 A | 8/1984 | Rask |
| 4,478,075 A | 10/1984 | Oyama et al. |
| 4,634,559 A | 1/1987 | Eckert |
| 4,817,387 A | 4/1989 | Lashbrook |
| 4,926,698 A | 5/1990 | Owen |
| 4,957,007 A | 9/1990 | Gray |
| 5,088,332 A | 2/1992 | Meriläinen et al. |
| 5,133,905 A | 7/1992 | Woody et al. |
| 5,365,795 A | 11/1994 | Brower, Jr. |
| 6,142,148 A | 11/2000 | Weckström et al. |
| 6,230,697 B1 | 5/2001 | Itoyama et al. |
| 6,457,353 B1 * | 10/2002 | Kanke et al. .............. 73/117.3 |

FOREIGN PATENT DOCUMENTS

JP        3-290051 A        12/1991

\* cited by examiner

*Primary Examiner*—Edward Lefkowitz
*Assistant Examiner*—Maurice Stevens
(74) *Attorney, Agent, or Firm*—Nixon Peabody LLP; Tim L. Brackett, Jr.; J. Bruce Schelkopf

(57) ABSTRACT

An EGR measurement device for recirculating a portion of exhaust gas of an internal combustion engine that is adapted to allow accurate measurement of exhaust gas flow when the exhaust gas flows in a reverse direction that is opposite to the forward direction toward the intake of the engine. In one embodiment, an extension portion is used which extends over a second tap to allow measurement of pressure in the reverse flow direction so that flow rate can be calculated. In another embodiment, one or more pitot tubes are provided that allows accurate measurement of exhaust gas flows when the exhaust gas flows in a reverse direction.

38 Claims, 17 Drawing Sheets

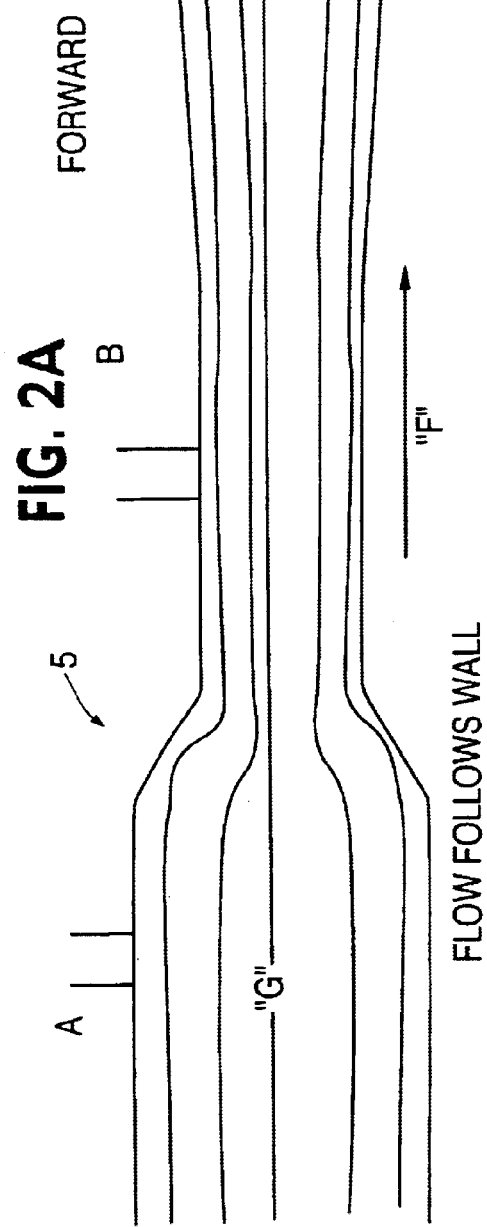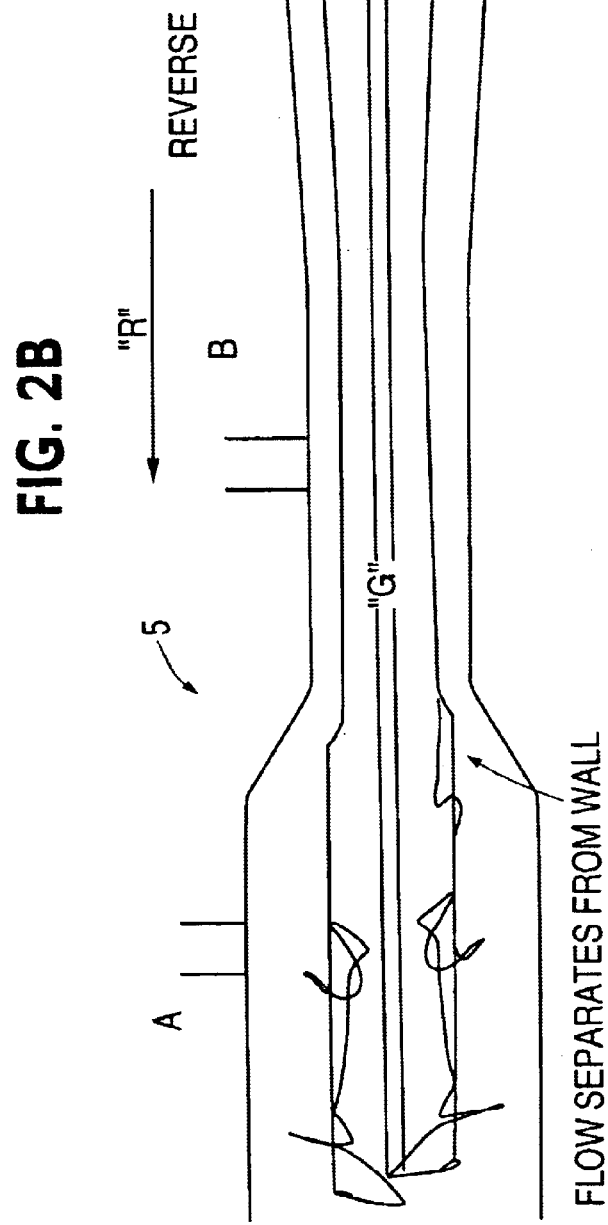

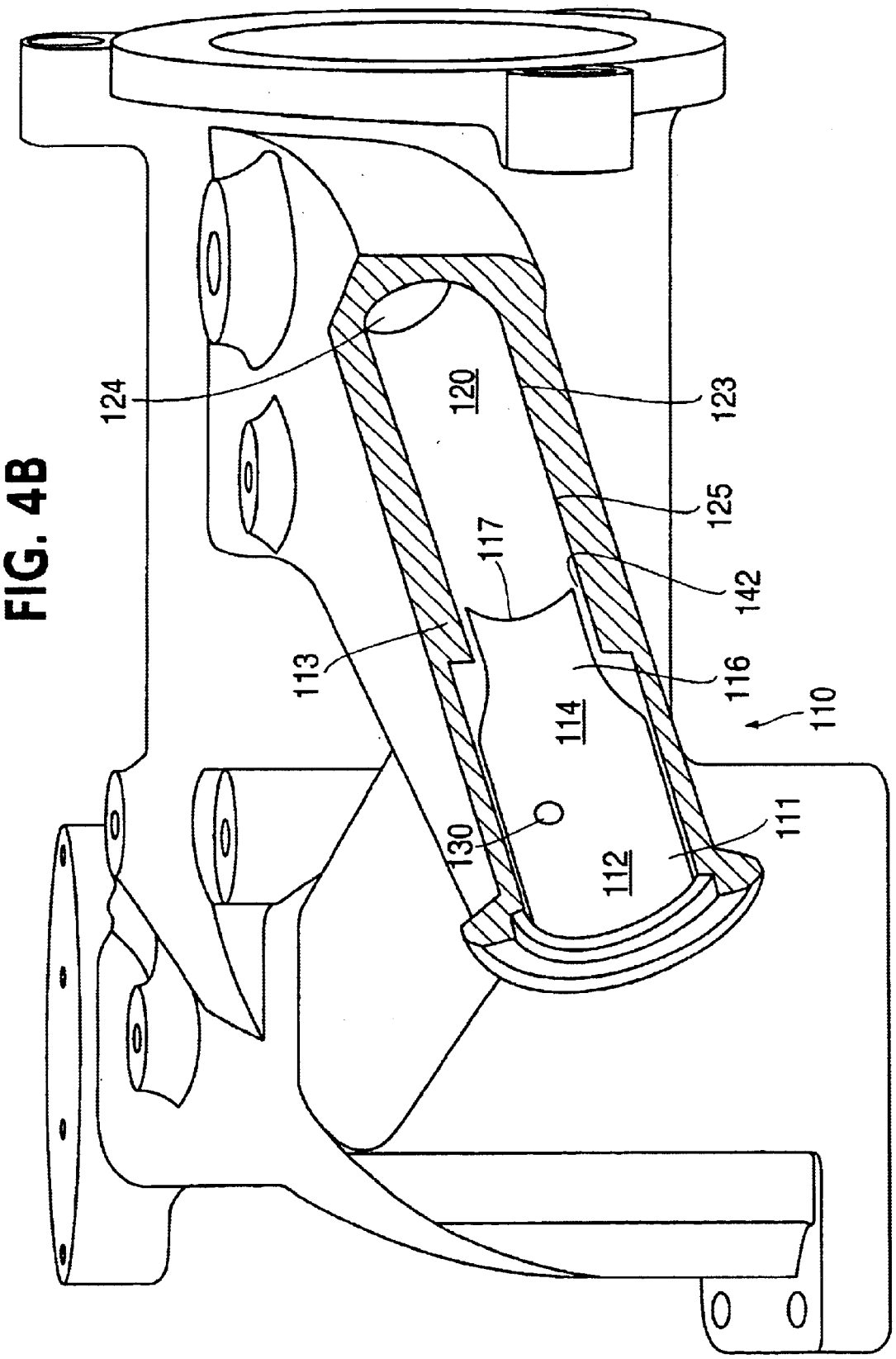

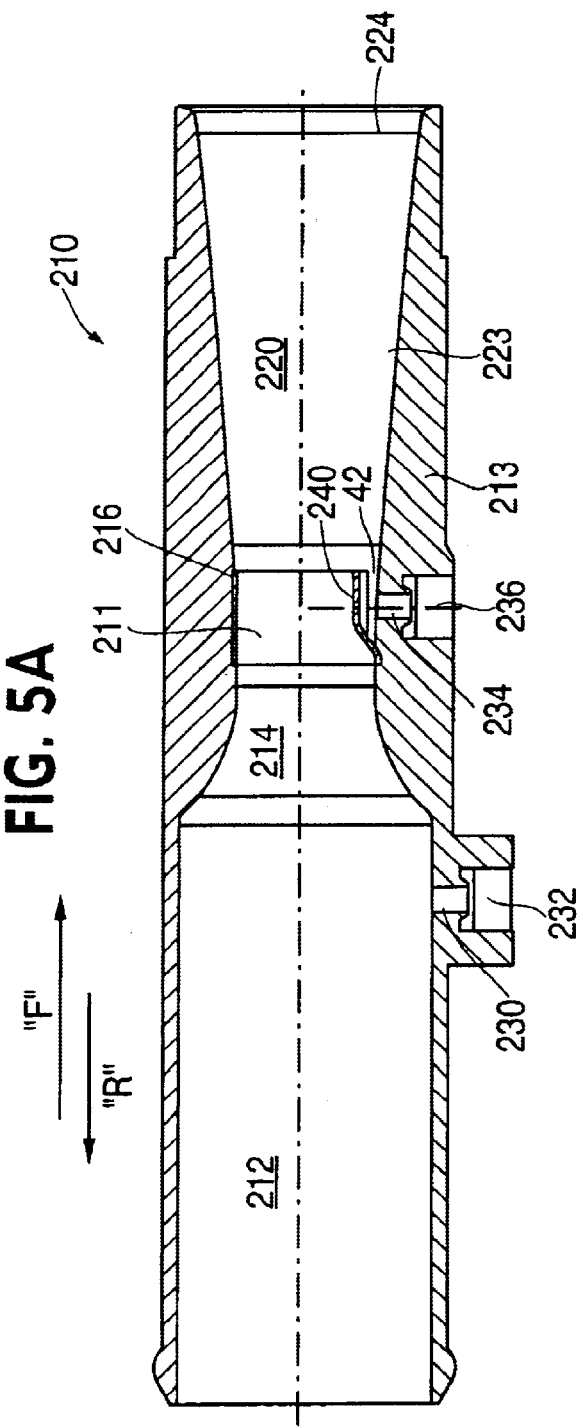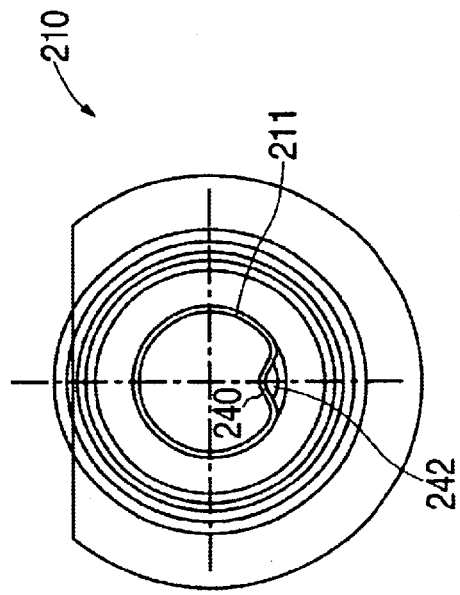

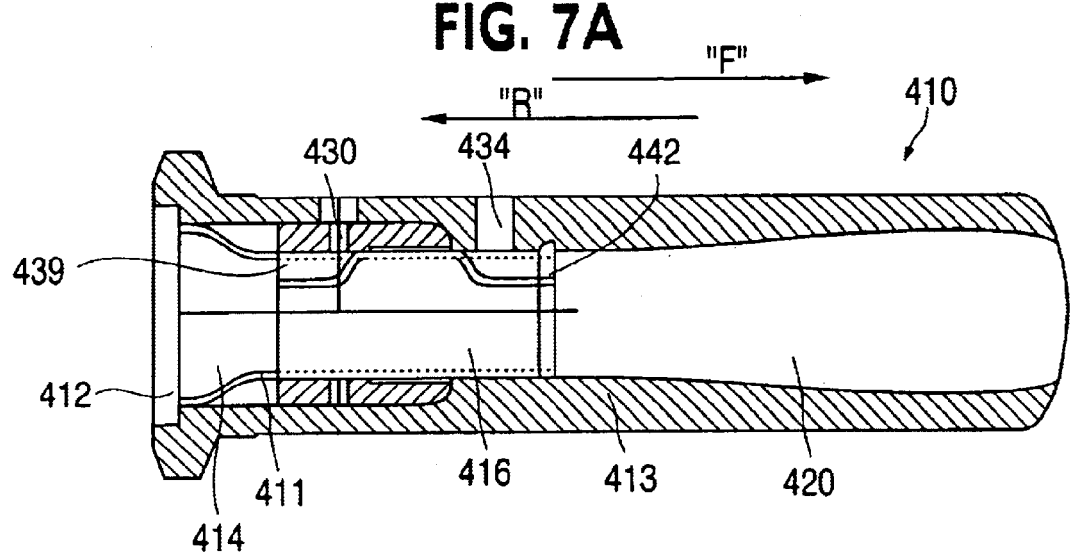
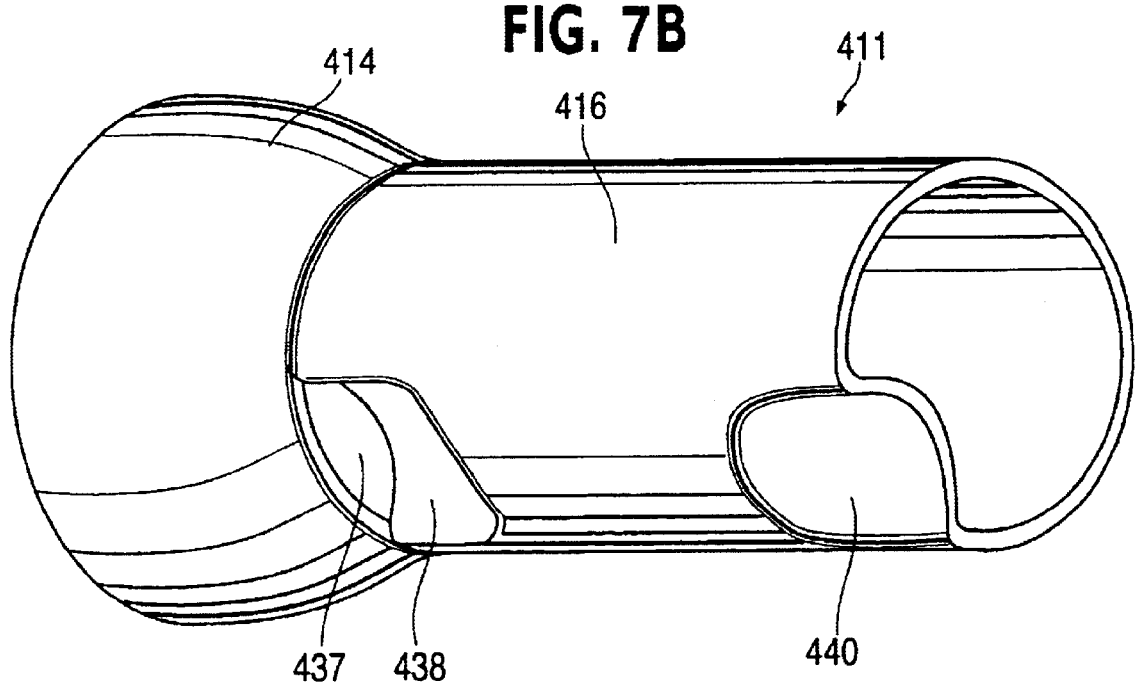

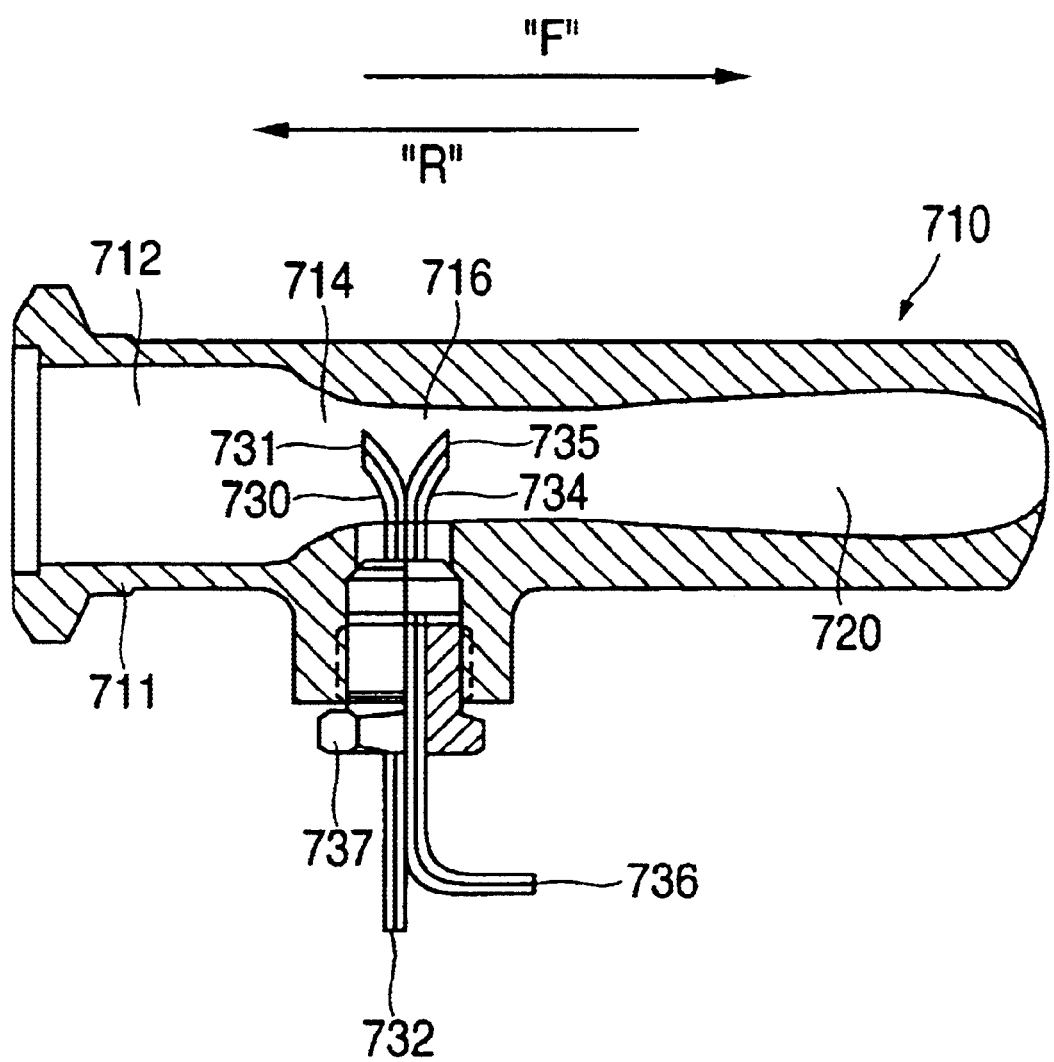

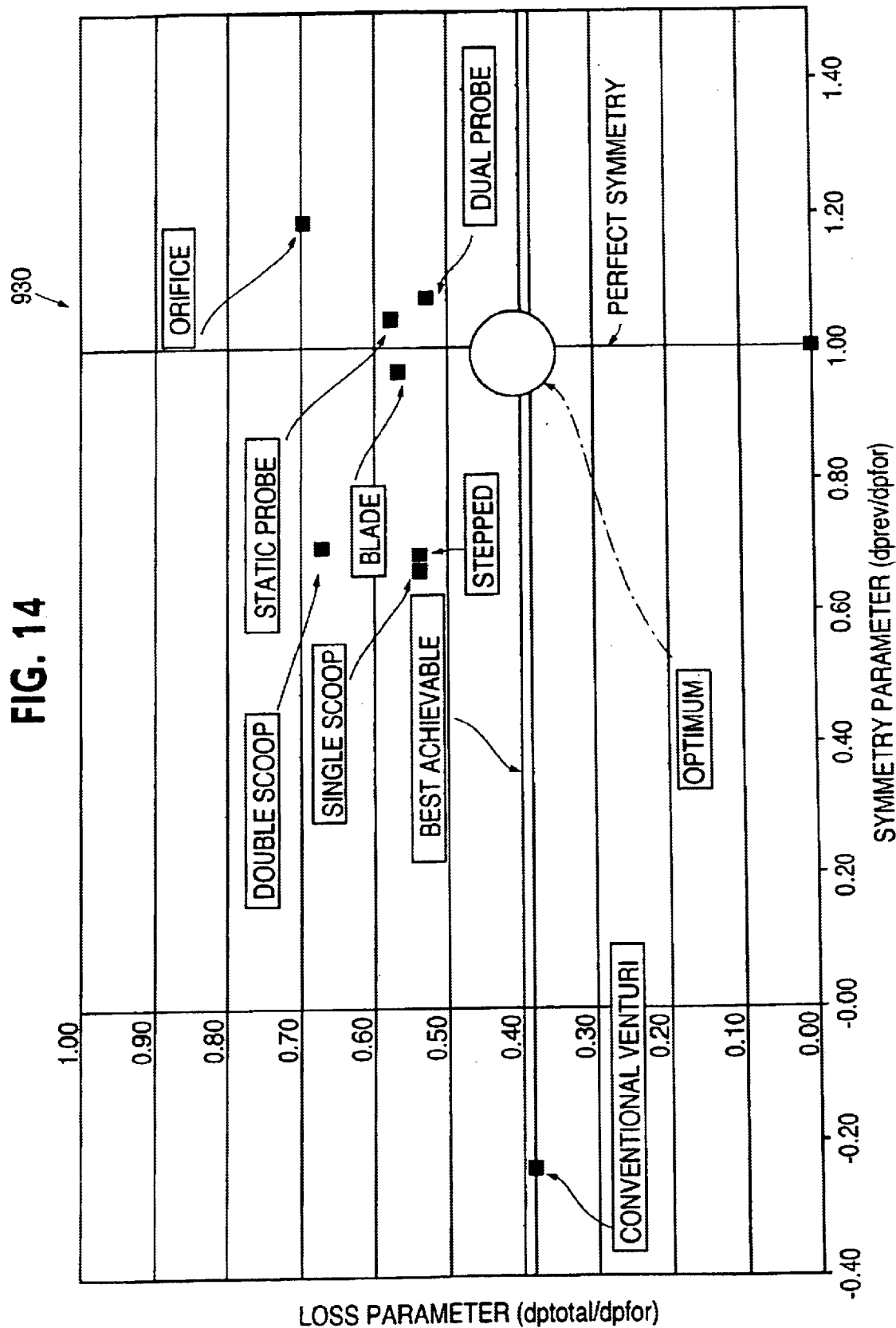

EXHAUST GAS RECIRCULATION MEASUREMENT DEVICE

BACKGROUND OF THE INVENTION

1. Field of the Invention

The present invention is directed to exhaust gas recirculation (EGR) systems. In particular, the present invention is directed to exhaust gas recirculation measurement devices for EGR systems that allow measurement of exhaust gas flow, even when the exhaust gas is flowing in a reverse direction.

2. Description of Related Art

The standards for vehicle emissions and other applications utilizing internal combustion engines have continued to increase to minimize environmental impact of fossil fuels. In particular, governmental regulations continue to require more and more fuel efficient vehicles and internal combustion engines with reduced emissions. Various emission components such as hydrocarbons (HC), nitrous oxides (NOx), particulates and other emission components have been significantly reduced recently by internal combustion engine manufacturers in view of these regulations, and the benefits to the environment. Many different methods have been utilized by manufacturers of internal combustion engines to reduce emissions including the use of catalytic converters, particulate traps, exhaust gas recirculation (herein after "EGR") systems, as well as other devices and techniques.

EGR systems typically operate by diverting a portion of the exhaust gases emitted by the internal combustion engine back to the intake airflow of die engine. The recirculated exhaust gas mixes with the intake air and is used in the combustion of additional fuel. Such recirculation of at least a portion of exhaust gases generated by the internal combustion engines reduces emissions of the engines, and has been used in the automotive industry for many years. To ensure proper operation of the internal combustion engine, the amount of exhaust gas that is recirculated by the EGR system must be controlled based on the operating conditions and parameters of the engine. Thus, many EGR systems include a valve that regulates the amount of exhaust gas that is recirculated to the intake of the engine, the valve being controllable based on the operating conditions and parameters.

In the above regard, various EGR systems have been proposed in the art. For example, Japanese Patent 3-290051 to Makoto discloses an EGR system where a portion of the engine exhaust gas is introduced into a suction pipe and a single pitot tube is installed at the exhaust part of an EGR passage. U.S. Pat. No. 6,230,697 to Itoyama et al. discloses an EGR control system which includes an air flow rate detection means for detecting a flow rate of intake air drawn into an internal combustion engine to output an air flow rate indicative signal. However, Itoyama et al. does not disclose a particular device for accomplishing the desired air flow rate detection.

Moreover, whereas various other devices for measuring airflow are known in the art, such devices are not applied to EGR systems of internal combustion engines and have not been shown to be effective in such applications where the gas being measured is exhaust gases of internal combustion engines having emission components of combustion such as particulates.

For example, U.S. Pat. No. 4,478,075 to Oyama et al. discloses an air flow meter where a protective plate associated with the upstream inlet is provided on the upstream side of a by-pass passage to prevent dust from entering the by-pass passage. The flow meter includes a venturi structure connected to a passage that is connected with the main passage via rectangular bore. Oyama et al. also discloses that the ratio of a flow rate of the air flowing in the by-pass passage to that of the air flowing in the main passage is set in advance to a predetermined level. The Oyama et al. reference further discusses the issue of reverse flow in an engine air handling system as it relates to intake air, but does not discuss an EGR measurement device that is used for an EGR system.

U.S. Pat. No. 3,910,113 to Brown discloses a pipe insert having a pressure sensing form including high pressure and low pressure taps on the high pressure and low pressure sides of the form. The Brown reference further discusses the issue of reversed flow within the pipe. However, the Brown reference does not disclose or otherwise suggest use of the pipe insert with an EGR system. U.S. Pat. No. 4,463,601 to Rask discloses a mass airflow measurement apparatus which addresses the issue of reverse flow. The apparatus of Rask includes center body which divides the airflow of the engine into two concentric branches which have different flow splits in forward and reverse directions where the reverse flow in one of the branches is greater than in the forward flow. The Rask reference, however, does not disclose or suggest the use of the mass airflow measurement apparatus in an EGR system.

U.S. Pat. No. 5,088,332 to Merilainen et al. discloses a gas flow restricting and directing device that measures flow in medical respirators and also addresses the issue of reverse flow. The gas flow restricting and directing device of Merilainen et al. includes apertures around which vanes or baffles are provided. However, as noted, this reference relates to medical respirators and does not disclose or otherwise suggest use of the gas flow restricting and directing device that measures flow in an EGR system.

As evident from the discussion provided below, there exists an unfulfilled need for an EGR measurement device that will allow precise measurement of the exhaust gas recirculated. There also exists an unfulfilled need for such an EGR measurement device that will allow measurement of exhaust gas recirculated when the exhaust gas is flowing in the reverse direction. There further exists an unfulfilled need for such an EGR measurement device that is cost effective to manufacture.

SUMMARY OF THE INVENTION

In order for the EGR system to precisely regulate the amount of exhaust gas that is recirculated into the intake of the internal combustion engine, accurate measurement of the EGR flow is required. It has been found that EGR flow is highly pulsitile, i.e. occurs in pulses, due to the exhaust valve events. The portion of the exhaust gas being recirculated generally flows from the exhaust of the internal combustion engine to the intake of the internal combustion engine. However, there are short periods of time where the flow of the exhaust gas in the EGR system reverses in direction so that the exhaust gas being recirculated flows from the intake side to the exhaust side of the internal combustion engine as the pressure in the exhaust manifold bottoms out.

The current method of quantifying EGR flow is to measure the pressure differential across an EGR measurement device in the EGR system that produces a total-to-static pressure drop. The Bernoulli equation is then used with the measured pressure differential to calculate the flow rate of the exhaust gas being recirculated to the intake of the internal combustion engine. As noted above, because the flow direction actually reverses for short time periods, it has been found to be desirable to provide a measurement device that allows a total-to-static pressure to be produced regardless of the direction of EGR gas flow. The prior art devices described above which are applicable to EGR systems do not have this capability of measuring exhaust gas recirculation flow when the exhaust gas is flowing in a reverse direction, and do not even recognize this issue of reverse flow in EGR systems.

FIG. 1 shows graph 1 with the desired pressure response as line 2 which may be attained by implementing the measurement device using an orifice in both the forward flow direction and the reverse flow direction. As shown, the x-axis of the graph 1 indicates the mass flow in pound of mass per minute (lbm/min) while the y-axis of the graph 1 indicates the delta pressure, i.e. the pressure differential, in pounds per square inch (psid). As shown, for the same mass flow, the pressure differential (delta-P) is the same magnitude in the reverse direction as it is in the forward direction except the changes in sign. The disadvantage and problem with implementing the measurement device as an orifice is that the pressure losses are very high which detrimentally effects fuel economy and power density of the internal combustion engine.

The measurement device may alternatively be implemented using a conventional venturi. Venturis are generally provided with diffuser sections that recover static pressure, and thus, reduce flow losses as compared to orifices. The performance data of a conventional venturi is also shown in FIG. 1 as series of circle data points 3. By utilizing a conventional venturi as the measurement device, the total pressure losses are significantly reduced than when utilizing an orifice. As shown, in the forward flow direction, the performance of venturis closely corresponds to the performance of the orifice. However, as also shown in FIG. 1, venturis do not produce the correct pressure differential response when the flow reverses direction, i.e. when the portion of the exhaust gas to be recirculated flows from the intake of the internal combustion engine to the exhaust of the internal combustion engine.

In the above regard, FIG. 2A shows a conventional venturi 5 where the exhaust gas "G" is flowing in the forward direction to the intake of the internal combustion engine as indicated by arrow "F". FIG. 2B shows the conventional venturi 5 where the exhaust gas "G" is flowing in the reverse direction as indicated by arrow "R". The venturi 5 is provided with tap A positioned at the inlet section of the venturi 5, and tap B that is positioned at the throat section of the venturi 5. Tap A and tap B may be used to obtain pressure information pressure differential, i.e. the pressure difference between tap A and tap B, which may then be utilized to determine mass flow using the Bernoulli equation with some corrective parameters.

In the forward direction as shown in FIGS. 1 and 2A, a pressure differential is produced which closely approximates the true total-to-static pressure differential. Since the flow velocity is low at tap A, the upstream pressure at tap A approximates the total pressure and the downstream pressure at tap B approximates the static pressure. Correspondingly, the total-to-static pressure differential may be readily determined.

In the reverse direction as shown in FIGS. 1 and 2B, an incorrect response is produced. Because tap B does not sense the total pressure of the flow in the reverse direction, the total-to-static pressure differential is highly inaccurate. In addition, the exhaust gas flowing in the reverse direction through the conventional venturi 5 partially separates form the inlet wall resulting in a rectified pressure difference with a positive change in pressure differential (delta-P) being produced as shown by the circle data points 3 of FIG. 1. Clearly, this results in erroneous flow measurement and precise monitoring and control of the amount of exhaust gas being recirculated by the EGR system cannot be attained.

In view of the foregoing, an advantage of the present invention is in providing an EGR measurement device that will allow precise measurement of pressure of the exhaust gas recirculated by the EGR system to allow the flow rate to be determined.

Another advantage of the present invention is in providing such an EGR measurement device that will allow measurement of the exhaust gas recirculated, even when the exhaust gas is flowing in the reverse direction.

Still another advantage of the present invention is in providing such an EGR measurement device that may be manufactured economically.

These and other advantages are provided by an EGR measurement device for recirculating a portion of the exhaust gas of an internal combustion engine in accordance with the present invention. In one embodiment, the EGR measurement device includes an exhaust gas inlet section having a substantially cylindrical shape, a convergent cone section connected to the exhaust gas inlet section, and a diffuser section connected to the convergent cone section. The convergent cone section includes a cone inlet, a throat portion, and a cone outlet that is radially smaller than the cone inlet, while the diffuser section includes a diffuser inlet, a divergent conical portion, and a diffuser outlet that is radially larger than the diffuser inlet. In accordance with the present invention, a means is provided for accurately measuring exhaust gas flow in the EGR measurement device when the exhaust gas flows in a reverse direction that is opposite to the forward direction.

In accordance with one embodiment of the present invention, the EGR measurement device includes a first tap in fluidic communication with the exhaust gas inlet section to allow measurement of a first pressure indicative of pressure of the exhaust gas in the exhaust gas inlet section, and a second tap positioned downstream of the first tap to allow measurement of a second pressure indicative of pressure of the exhaust gas downstream of the first tap. Accurate measurement of exhaust gas flowing in the forward direction and the reverse direction may be attained based on a pressure difference between the first pressure and the second pressure.

In one preferred embodiment, the means for accurately measuring exhaust gas flow in the reverse direction includes an extension portion that extends substantially over the second tap, the extension portion defining an alcove that is fluidically open in the forward direction to the throat portion of the convergent cone section and/or the divergent conical portion of the diffuser section.

In another implementation, the exhaust gas inlet section and the convergent cone section are formed together as an integrated component that is secured to the diffuser section, the throat portion of the convergent cone section defining the extension portion substantially extending over the second tap to define an annular alcove that is fluidically open in the forward direction. The diffuser section may also include a substantially straight tubular portion upstream in the forward direction of the divergent conical portion.

In accordance with another implementation, the convergent cone section is formed as an insert, the throat portion of the convergent cone section defining the extension portion substantially extending over the second tap. In this regard, the throat portion may be provided with an indentation that defines the extension portion substantially extending over the second tap.

In still another embodiment, the EGR measurement device may be provided with a convergent cone section that is formed as an insert, the throat portion of the convergent cone section having a first indentation that defines the extension portion substantially extending over the first tap and forming a first alcove, and having a second indentation that defines a second extension portion that substantially extends over the second tap, the second extension portion defining a second alcove.

In accordance with another embodiment of the present invention, the EGR measurement device may include a first tap in fluidic communication with the exhaust gas inlet section to allow measurement of a first pressure indicative of pressure of the exhaust gas in the exhaust gas inlet section, and a pitot tube having an opening positioned at substantially center of the throat portion of the convergent cone section to allow measurement of a second pressure indicative of pressure of the exhaust gas in the throat portion of the convergent cone section. Preferably, the pitot tube is fluidically open in the forward direction.

In accordance with still another embodiment, the means comprises a first pitot tube positioned at substantially center of the throat portion of the convergent cone section, the first pitot tube having an opening fluidically open in the reverse direction to allow measurement of a first pressure, and a second pitot tube positioned at substantially center of the throat portion of the convergent cone section, the second pitot tube having an opening fluidically open in the forward direction to allow measurement of a second pressure.

In this regard, in one implementation, the first pitot tube and the second pitot tube may be secured to one another. In another implementation, the first pitot tube and the second pitot tube may be provided on a blade positioned at substantially center of the throat portion of the convergent cone section. The first pressure may be static pressure or total pressure, and the second pressure, the other pressure.

These and other advantages and features of the present invention will become more apparent from the following detailed description of the preferred embodiments of the present invention when viewed in conjunction with the accompanying drawings.

BRIEF DESCRIPTION OF THE DRAWINGS

FIG. 2 is a schematic illustration of exhaust gas flowing through a conventional venturi in a forward direction and a reverse direction.

FIG. 4B is a partial cross-sectional perspective view of the EGR measurement device of FIG. 4A.

FIG. 5A is a cross-sectional side view of an EGR measurement device in accordance with yet another embodiment of the present invention.

FIG. 5B is an end view of the EGR measurement device of FIG. 5A.

FIG. 7A is a cross-sectional side view of an EGR measurement device in accordance with still another embodiment of the present invention.

FIG. 7B is an enlarged perspective view of the venturi insert of the EGR measurement device of FIG. 7A.

FIG. 10 is a cross-sectional side view of an EGR measurement device in accordance with another embodiment of the present invention that utilizes two pitots.

FIG. 14 is a graph showing the symmetry and loss performance of the EGR measurement devices for an EGR system in accordance with various embodiments of the present invention as applied to an example engine.

DETAILED DESCRIPTION OF THE PREFERRED EMBODIMENT

Figure 3:
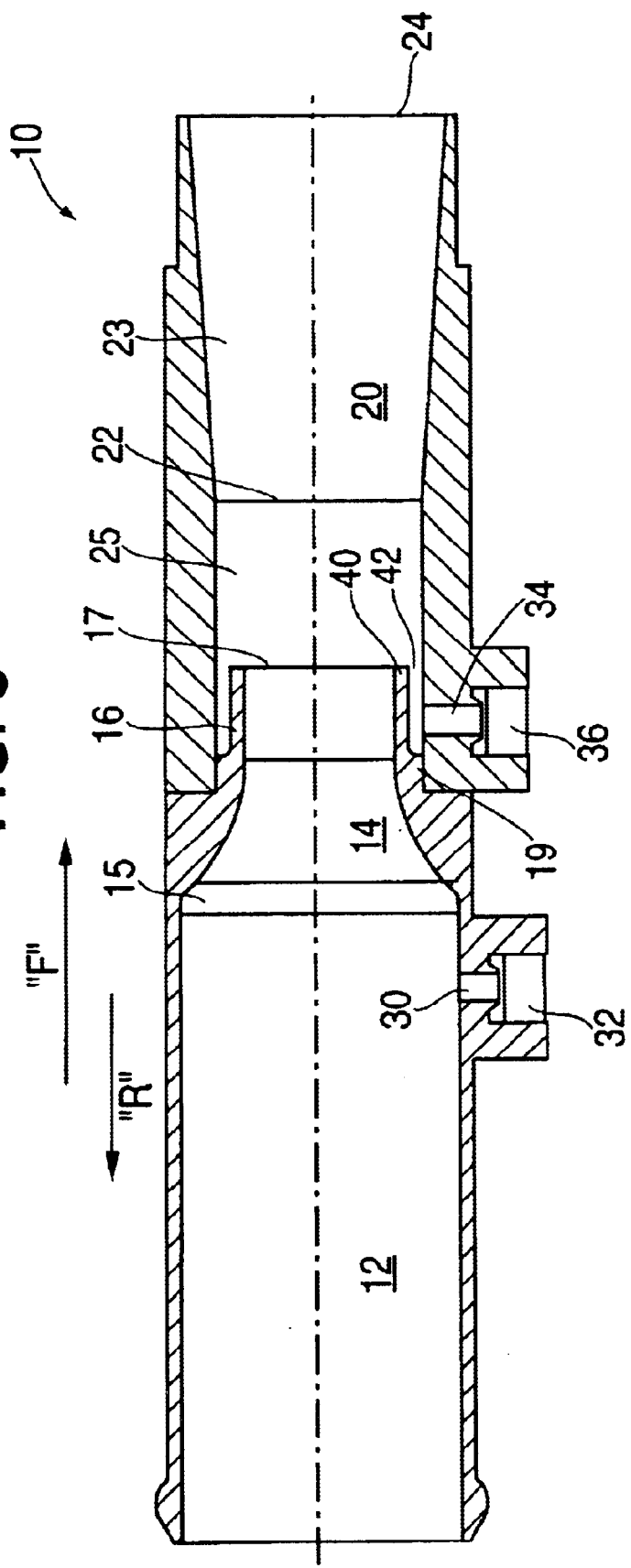
FIG. 3 is a cross-sectional side view of an EGR measurement device for an EGR system in accordance with one embodiment of the present invention.

FIG. 3 is a cross-sectional side view of an EGR measurement device 10 in accordance with one embodiment of the present invention that may be used in an EGR system for recirculating at least a portion of the exhaust gas from an internal combustion engine (not shown) into the intake of the internal combustion engine. As will be evident from the discussion set forth below, the EGR measurement device 10 of the present invention allows accurate measurement of pressure of the exhaust gas recirculated by the EGR system, even when the exhaust gas is flowing in the reverse direction. This allows the flow rate of the exhaust gas to be determined, even in the reverse direction of flow. Moreover, as will be evident from the discussions of various other embodiments, the present invention provides such an EGR measurement device that may be manufactured economically to minimize cost.

Referring to FIG. 3, a cross-sectional side view of the EGR measurement device 10 is shown so that the novel features of the EGR measurement device 10 can be clearly described. In the illustrated embodiment, the exhaust gas from the internal combustion engine that is to be recirculated generally flows in a forward direction of arrow "F" to an intake of the internal combustion engine (not shown). The EGR measurement device 10 includes an exhaust gas inlet section 12 having a substantially cylindrical shape, a convergent cone section 14 connected to the exhaust gas inlet section 12, and a diffuser section 20 connected to the convergent cone section 14.

The convergent cone section 14 includes a cone inlet 15, a throat portion 16, and a cone outlet 17 that is radially smaller than the cone inlet 15 so that the convergent cone section 14 causes a pressure differential between the cone inlet 15 and the cone outlet 17. The diffuser section 20 includes a diffuser inlet 22, a divergent conical portion 23, and a diffuser outlet 24 that is radially larger than the diffuser inlet 22. In addition, in the illustrated embodiment, the diffuser section 20 is further provided with an optional straight tubular portion 25 between the diffuser inlet 22 and the cone outlet 17.

In accordance with the illustrated embodiment of the present invention, the EGR measurement device 10 is provided with a means for allowing accurate measurement of the exhaust gas flow when the exhaust gas flows in a reverse direction of arrow "R" that is opposite to the forward direction of arrow F. It should be understood that generally, the portion of exhaust gas to be recirculated moves in the forward direction of arrow F to the intake of the internal combustion engine to which the EGR measurement device 10 is applied. However, as noted previously, the exhaust gas flow is pulsitile due to the operation of the exhaust valves. Consequently, for a very brief period of time, the portion of exhaust gas to be recirculated may actually move in the reverse direction of arrow R away from the intake of the internal combustion engine. As explained in further detail below, the EGR measurement device 10 is provided with a means for allowing accurate measurement of the exhaust gas flow when the exhaust gas flows in the reverse direction of arrow R during this brief period of time.

In particular, in accordance with the illustrated embodiment of the present invention, the EGR measurement device 10 includes a first tap 30 in fluidic communication with the exhaust gas inlet section 12 to allow measurement of a first pressure indicative of pressure of the exhaust gas in the exhaust gas inlet section 12 via the pressure sensor 32. The EGR measurement device 10 also includes a second tap 34 positioned downstream of the first tap 30 to allow measurement of a second pressure indicative of pressure of the exhaust gas downstream of the first tap 30. In the illustrated embodiment, the second tap 34 is provided to allow measurement of a second pressure along the straight tubular portion 25 of the diffuser section 20 via pressure sensor 36.

The pressure sensors 32 and 36 may be any sensor appropriate for sensing pressure in the EGR measurement device 10 such as a pressure differential sensor or the like. The first pressure signal and the second pressure signal may then be provided to a processor such as the internal combustion engine's engine control unit (ECU) (not shown) which processes these pressure signals to determine the pressure differential (delta-P) and correspondingly control the amount of exhaust gas to be recirculated into the EGR system via a control valve or the like (not shown). Moreover, as discussed in further detail below, accurate measurement of exhaust gas flowing in both the forward direction of arrow F, and the reverse direction of arrow R may be attained based on a pressure difference between the first pressure at the first tap 30 and the second pressure at the second tap 34.

In the illustrated embodiment, the means for accurately measuring exhaust gas flow in the reverse direction of arrow R includes an extension portion 40 that extends substantially over the second tap 34. As can be seen, in the present embodiment, extension portion 40 is defined by the throat portion 16 of the convergent cone section 14. The extension portion 40 defines an alcove 42 that is fluidically open in the forward direction of arrow F. The alcove 42 is thus open to the straight tubular portion 25 of the diffuser section 20. Of course, in other embodiments, the alcove 42 may be open to the divergent conical portion 23 of the diffuser section 20 instead. In addition, because the extension portion 40 is defined by the throat portion 16, it should also be evident that the alcove 42 is annular in shape in the illustrated embodiment.

In operation, the EGR measurement device 10 of the illustrated embodiment may be used to determine the flow of exhaust gas in both the forward direction of arrow F, as well as in the reverse direction of arrow R. In particular, when the exhaust gas to be recirculated is flowing in the forward direction of arrow F, the first tap 30 allows the measurement of the pressure in the exhaust gas inlet section 13 via the pressure sensor 32 which approximates the total pressure. In addition, the second tap 34 allows the measurement of the pressure in the alcove 42 via the pressure sensor 36 which is substantially the same as the pressure in the throat portion 16 and approximates the static pressure.

The pressure differential between the first tap 32 and the second tap 34 may be determined. Using the Bernoulli equation and the pressure differential, the mass flow rate of the exhaust gas flowing through the EGR measurement device 10 in the forward direction of arrow F may then be calculated which closely approximates the actual mass flow rate in the forward direction. A correction factor may be empirically determined and incorporated into the calculation of mass flow rate as needed so that the mass flow rate may be more accurately determined. In addition, it should also be noted that the use of the Bernoulli equation is also provided as merely one implementation of how the flow rate may be determined using the EGR device of the present invention. However, other mathematical models relating pressure to flow rate may alternatively be used as well.

When the flow direction of the exhaust gas to be recirculated reverses to the direction of arrow R, the pressure in the exhaust gas inlet section 12 as measured by the pressure sensor 32 via the first tap 30 approximates the static pressure. In addition, the pressure in the alcove 42 as measured by the pressure sensor 36 via the second tap 34 approximates the total pressure. Therefore, the provision of the extension portion 40 in accordance with the illustrated embodiment of the present invention allows the first and second taps 30 and 34 to effectively switch functions when the exhaust gas flows in the reverse direction of arrow R. This allows the pressure differential to be determined and by using the Bernoulli or other equation, the mass flow rate of the exhaust gas flowing through the EGR measurement device 10 in the reverse direction of arrow R may then be calculated which closely approximates the actual mass flow rate in the reverse direction. Again, a correction factor may be empirically determined and incorporated into the determination of mass flow rate as needed so that the mass flow rate may be more accurately determined.

Moreover, the EGR measurement device 10 of the illustrated embodiment may be manufactured in an economical, cost effective manner. As shown, the EGR measurement device 10 is implemented in two parts that are assembled together. In particular, the exhaust gas inlet section 12 is formed together with the convergent cone section 14, which is secured to the diffuser section 20. An edge surface 19 may be provided at the interface between the convergent cone section 14 and the diffuser section 20 in accordance with one embodiment to facilitate proper assembly and formation of the alcove 42 upon securing these two parts together. Thus, the assembly of these two parts is very simple and the throat portion 16 automatically defines the extension portion 40 that forms the alcove 42 in which the second tap 34 is positioned. Of course, in other embodiments, the EGR measurement device may be implemented differently with different numbers of components. However, it should be evident how the present implementation provides a very economical implementation that may be manufactured in a cost effective manner.

The EGR measurement device 10 of the illustrated embodiment, and the components thereof, may be manufactured in any appropriate manner such as via casting, forming, molding, and/or machining, and may be made of any appropriate materials including metals such as iron, steel, aluminum alloys, or synthetic materials such as thermoplastics, composites, and the like. Of course, the above noted methods of manufacture and the materials that may be used are merely provided as examples only, and any appropriate manufacturing methods and materials may be used in implementing the present invention.

Figure 4A:
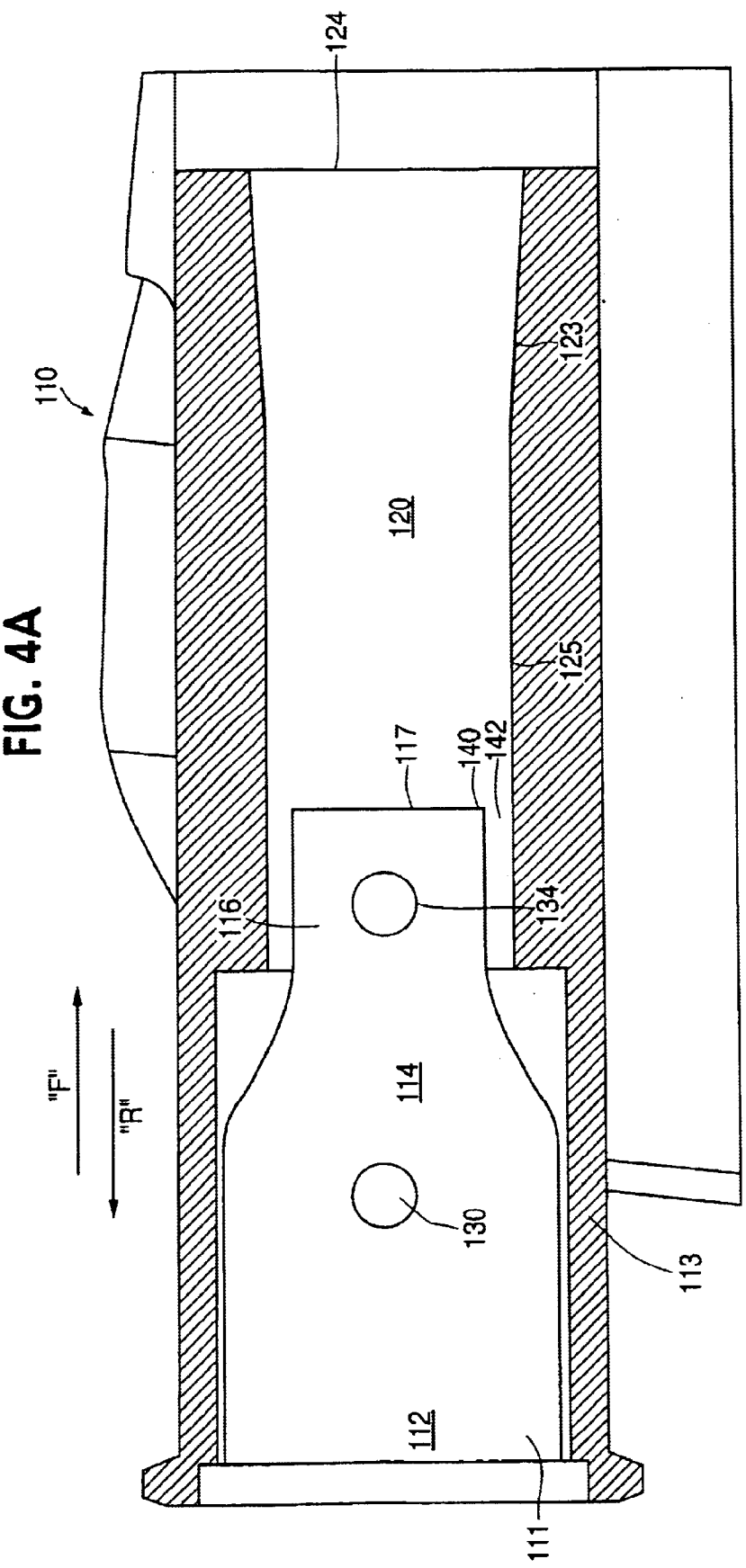
FIG. 4A is a cross-sectional side view of an EGR measurement device in accordance with another embodiment of the present invention.

FIGS. 4A and 4B show cross-sectional views of an EGR measurement device 110 for an EGR system in accordance with another embodiment of the present invention. It should be noted that to facilitate understanding of this and other embodiments of the present invention described below, the various components of the EGR measurement device has been enumerated using the same numerals as the embodiment discussed above in FIG. 3 except that the numerals are in the hundreds.

As shown, the EGR measurement device 10 includes an exhaust gas inlet section 112, a convergent cone section 114 connected to the exhaust gas inlet section 112, and a diffuser section 120 connected to the convergent cone section 114. The convergent cone section 114 is frustaconically shaped and includes a throat portion 116, and a cone outlet 117. In the illustrated embodiment, the exhaust gas inlet section 112 and the convergent cone section 114 are formed integrally together as an insert 111 which is inserted into housing 113 that is provided with the diffuser section 120.

The diffuser section 120 includes a divergent conical portion 123, and an optional straight tubular portion 125, both of which are integrally formed in the housing 113 which may machined, molded, cast otherwise formed in any other appropriate manner. The EGR measurement device 110 includes a first tap 130 provided in the insert 111 that is in fluidic communication with the exhaust gas inlet section 112, and a second tap 134 positioned downstream of the first tap 130 on the housing 113, the second tap 134 being behind the insert 111 in the illustrations of FIGS. 4A and 4B. As shown, extension portion 140 is defined by the throat portion 116 of the convergent cone section 114 and defines an alcove 142 that is fluidically open in the forward direction of arrow F. Thus, the alcove 142 formed by the extension portion 140 is open to the straight tubular portion 125 of the diffuser section 120.

The EGR measurement device 110 of the illustrated embodiment of FIGS. 4A and 4B may be used to measure the flow of exhaust gas in both the forward direction of arrow F, as well as in the reverse direction of arrow R. When the exhaust gas to be recirculated is flowing in the forward direction of arrow F, the tap 130 allows the measurement of the pressure in the exhaust gas inlet section 112 to approximate the total pressure. In addition, the tap 134 allows the measurement of the pressure in the alcove 142 to approximate the static pressure. When the flow direction of the exhaust gas being recirculated reverses to the direction of arrow R, the pressure in the exhaust gas inlet section 112 measured via tap 130 approximates the static pressure while the pressure in the alcove 142 measured via tap 134 approximates the total pressure.

The pressure differential may be then determined based on the difference in pressure between the first tap 130 and the second tap 134. By using the Bernoulli or other appropriate equation, the mass flow rate of the exhaust gas flowing through the EGR measurement device 110 in the forward direction of arrow F, or in the reverse direction of arrow R, may then be calculated which closely approximates the actual mass flow rate in the respective forward and reverse directions. Again, a correction factor may be empirically determined and incorporated into the determination of mass flow rate as needed.

As can be appreciated most clearly in the illustration of FIG. 4B, by providing the exhaust gas intake section 112 and the convergent cone section 114 on an insert 111, the EGR measurement device 110 may be implemented in a very cost effective manner and be assembled quickly, and easily, further reducing cost associated with the EGR measurement device. The housing 113 may be cast or molded as an integral piece to which the insert 111 is secured. The insert 111 itself, may be extruded or formed from a tubular section. Of course, FIG. 4B also shows other components of the EGR system of which the EGR measurement device 110 is a part of, the details of which is not required to understand the present invention.

FIGS. 5A and 5B show a cross-sectional side view and an end view of an EGR measurement device 210 for an EGR system in accordance with still another embodiment of the present invention. The EGR measurement device 210 includes an exhaust gas inlet section 212, a convergent cone section 214, and a diffuser section 220 like the previously described embodiments. The convergent cone section 214 is frustaconically shaped and includes a throat portion 216 which in the present embodiment, is implemented as an insert 211. The insert 211 is inserted into housing 213 that is provided with the exhaust gas inlet section 212, the convergent cone section 214 and the diffuser section 220 as shown.

The EGR measurement device 210 also includes a first tap 230 that is in fluidic communication with the exhaust gas inlet section 212, and a second tap 234 positioned downstream of the first tap 230 on the housing 213. As can be seen, the throat portion 216 of insert 211 is also provided with an extension portion 240 which may be formed by an indentation in the throat portion 216. The extension portion 240 defines an alcove 242 that is fluidically open in the forward direction of arrow F. Thus, the alcove 242 is formed by the extension portion 240 of the insert 211 and extends substantially over the second tap 234. Moreover, in contrast to the previously described embodiment of FIGS. 4A and 4B in which the insert was provided with the exhaust gas inlet section and the convergent cone section, the present embodiment provides an insert 211 with only the throat portion 216 and the extension portion 240.

The EGR measurement device 210 of the illustrated embodiment of FIGS. 5A and 5B functions like the embodiments previously discussed, and may be used to measure the flow of exhaust gas in both the forward direction of arrow F, as well as in the reverse direction of arrow R. In the forward direction of arrow F, the first tap 230 allows the measurement of the pressure in the exhaust gas inlet section 212 via pressure sensor 232 to approximate the total pressure. In addition, the second tap 234 allows the measurement of the pressure in the alcove 242 via pressure sensor 236 which approximates the static pressure. When the flow direction of the exhaust gas being recirculated reverses to the direction of arrow R, the pressure in the exhaust gas inlet section 212 measured via the first tap 230 approximates the static pressure while the pressure in the alcove 242 measured via the second tap 234 approximates the total pressure.

The pressure differential between tap 232 and tap 234 may be used with the Bernoulli or other equation so that the mass flow rate of the exhaust gas flowing through the EGR measurement device 210 in the forward direction of arrow F, or in the reverse direction of arrow R, may then be calculated which closely approximates the actual mass flow rate in the respective forward and reverse directions. A correction factor may be empirically determined and incorporated to more accurately determine the mass flow rate. As can be appreciated, by implementing the throat portion 216 and the extension portion 240 via the insert 211, the EGR measurement device 210 may be implemented in a very cost effective manner.

Figure 6A:
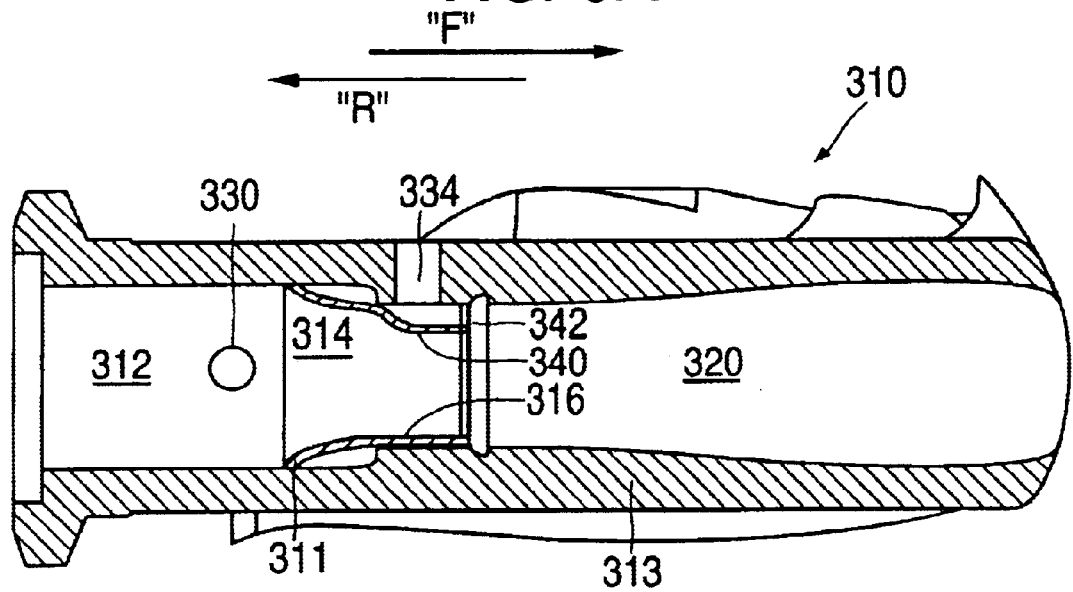
FIG. 6A is a cross-sectional side view of an EGR measurement device in accordance with another embodiment of the present invention.

FIG. 6A shows a cross-sectional side view of an EGR measurement device 310 for an EGR system in accordance with yet another embodiment of the present invention. The EGR measurement device 310 includes an exhaust gas inlet section 312, a convergent cone section 314, and a diffuser section 320 like the previously described embodiments. The convergent cone section 314 includes a throat portion 316 which is integrally formed therewith and is implemented as an insert 311 which is inserted into housing 313 that is provided with the exhaust gas inlet section 312 and the diffuser section 320.

The EGR measurement device 310 includes a first tap 330 and a second tap 334 provided on the housing 313. The insert 311 is provided with the throat portion 316 and is provided with an extension portion 340 that extends substantially over the second tap 334 and defines an alcove 342 that is fluidically open in the forward direction of arrow F. As shown, the extension portion 340 is formed in the present embodiment by an indentation in the throat portion 316. By implementing the convergent cone section 314 and the throat portion 316 thereof as the insert 311, the EGR measurement device 310 may be implemented in a very cost effective manner.

Figure 6B:
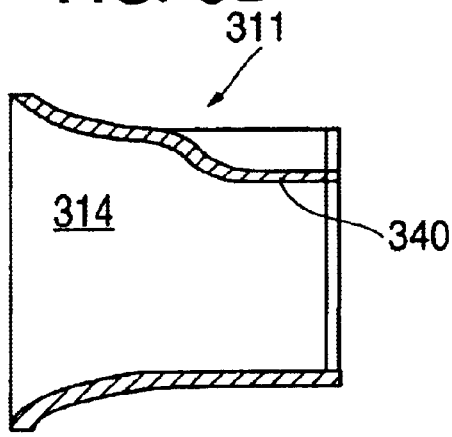
FIG. 6B is an enlarged cross-sectional side view of the venturi insert of the EGR measurement device of FIG. 6A.
Figure 6C:
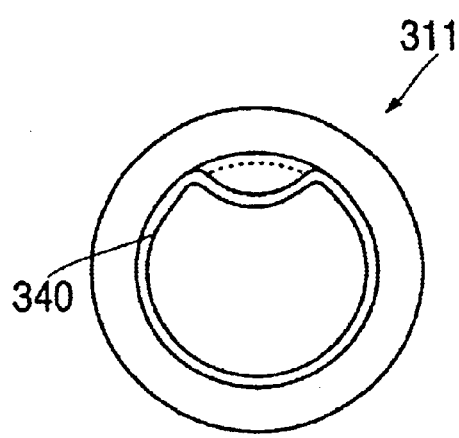
FIG. 6C is an end view of the venturi insert of FIG. 6B.

FIGS. 6B and 6C show enlarged views of the insert 311 that is provided with the convergent cone section 314 and the throat portion 316. As clearly shown in both of the figures, the extension portion 340 is formed by providing an indentation in the throat portion 316 so that when the insert 311 is installed in the housing 313 as shown in FIG. 6A, an alcove 342 is formed so that measurement of the flow of exhaust gas in both the forward direction of arrow F, and in the reverse direction of arrow R may be obtained.

As described previously relative to the other embodiments, the pressure differential between the first tap 330 and the second tap 334 may be used with the Bernoulli or other appropriate equation to calculate the mass flow rate of the exhaust gas flowing through the EGR measurement device 310 in the forward direction of arrow F, or in the reverse direction of arrow R. A correction factor may be empirically determined and incorporated to more accurately determine the mass flow rate.

FIG. 7A shows a cross-sectional side view of an EGR measurement device 410 for an EGR system in accordance with yet another embodiment, the EGR measurement device 410 including an exhaust gas inlet section 412, a convergent cone section 414, and a diffuser section 420. The convergent cone section 414, and the throat portion 416 are implemented as an insert 411 most clearly shown in FIG. 7B. The insert 411 is inserted into housing 413 that is provided with the exhaust gas inlet section 412 and the diffuser section 420.

The housing 413 of the EGR measurement device 410 includes a first tap 430 and a second tap 434. As shown most clearly in FIG. 7B, the throat portion 416 of the insert 411 is provided with a first extension portion 438 that extends substantially over the first tap 430 and defines an alcove 439 that is fluidically open in the reverse direction of arrow R. In addition, the throat portion 416 of the insert 411 is also provided with a second extension portion 440 that extends substantially over the second tap 434 and defines an alcove 442 that is fluidically open in forward direction of arrow F. As can be seen, the first and second extension portions 438 and 440 may be indentations on the throat portion 416 of the insert 411, the first extension portion 438 being further defined by cutaway 437.

In a manner similar to the prior embodiments, the EGR measurement device 410 may be used to measure the flow of exhaust gas in both the forward direction of arrow F, and in the reverse direction of arrow R. As described previously relative to the other embodiments, the pressure differential may be determined by determining the difference between first tap 430 and second tap 434. By using the Bernoulli or other appropriate equation, the mass flow rate of the exhaust gas flowing through the EGR measurement device 410 in the forward direction of arrow F, or in the reverse direction of arrow R, may then be calculated to approximate the actual mass flow rate in both the forward and reverse directions, and a correction factor may also be determined and used.

Figure 8A:
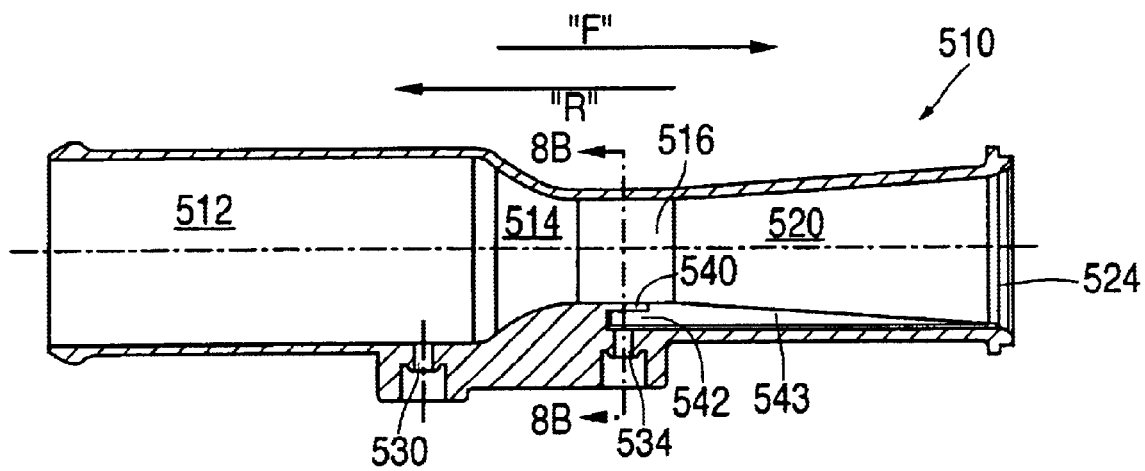
FIG. 8A is a cross-sectional side view of an EGR measurement device for an EGR system in accordance with yet another embodiment of the present invention.
Figure 8B:
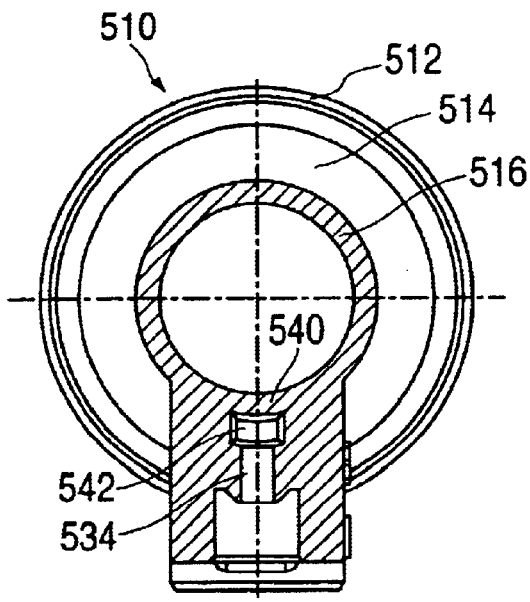
FIG. 8B is a frontal view of the exhaust measurement device of FIG. 8A as viewed along 8B—8B.

FIGS. 8A and 8B show cross-sectional views of an EGR measurement device 510 for an EGR system in accordance with another embodiment of the present invention. Like the previously described embodiments, the EGR measurement device 510 includes an exhaust gas inlet section 512, a convergent cone section 514, and a diffuser section 520. The convergent cone section 514 is frustaconically shaped and includes a throat portion 516 that is substantially tubular in shape. As can be seen in FIG. 8A, the EGR measurement device 510 of the present embodiment is made as a unitary piece with the exhaust gas inlet section 512, the convergent cone section 514, and the diffuser section 520 being formed integrally together.

Figure 8C:
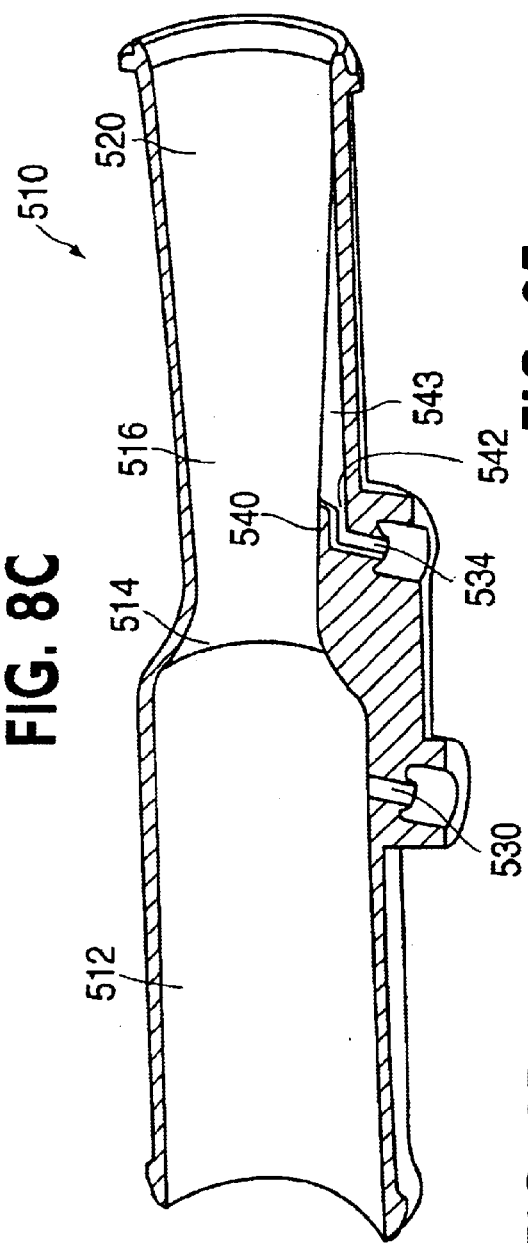
FIG. 8C is a perspective cross-sectional side view of the exhaust measurement device of FIG. 8A.

The EGR measurement device 510 includes a first tap 530 that is in fluidic communication with the exhaust gas inlet section 512, and a second tap 534 positioned downstream of the first tap 530 on the housing 513. An extension portion 540 is provided on the throat portion 516 that extends substantially over the second tap 534, the extension portion 540 defining an alcove 542 that is fluidically open in the forward direction of arrow F, the alcove 542 being most clearly shown in FIG. 8B. In this regard, the alcove 542 is open to a channel 543 which extends along the diffuser section 520 in the manner shown in FIG. 8A and FIG. 8C.

Figure 8E:
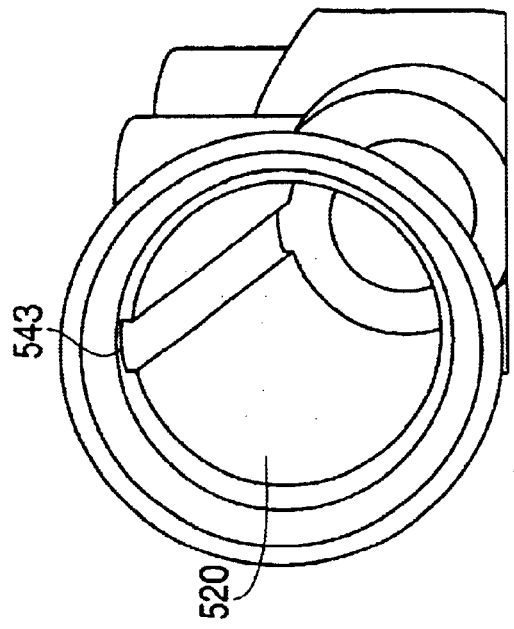
FIG. 8E is an end perspective view of the exhaust measurement device of FIG. 9A clearly showing the channel.
Figure 8D:
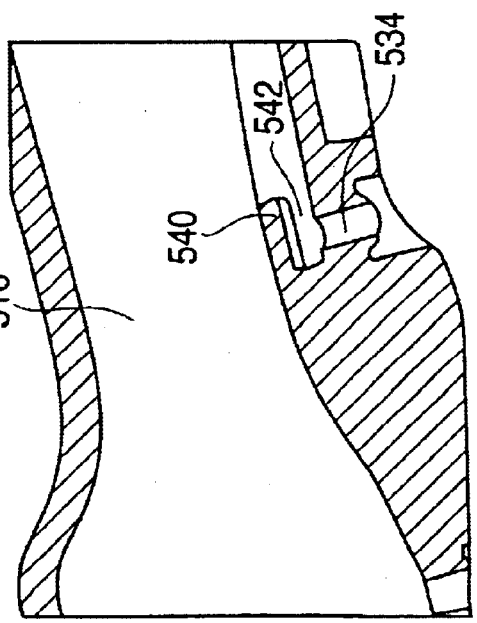
FIG. 8D is a partial perspective view of the exhaust measurement device of FIG. 8A clearly showing the extension portion that forms the alcove.

As shown in FIG. 8D, the extension portion 540 is integrally formed so as to provide an alcove 542 over the second tap 534. The channel 543 extending along the diffuser section 520 and leading to the alcove 542 is also shown in FIG. 8E. As can be seen, the channel 543 is provided along only a section of the diffuser section 520 and extends substantially the whole length of the diffuser section 520 in the present embodiment. By providing an extension portion 540 that is integrally formed in the EGR measurement device 510, cost associated with manufacturing and installing a separate component such as an insert is avoided thereby providing a very economical implementation of the EGR measurement device. Of course, in other embodiments, the channel 543 may only extend a partial length of the diffuser section 520. In addition, whereas the channel 543 is preferably integrally formed in the EGR measurement device 510 in the present embodiment, the channel 543 may alternatively be machined out from the diffuser section 520 in other embodiments.

Like the embodiments previously discussed, the EGR measurement device 510 of the illustrated embodiment of FIGS. 8A to 8E may be used to measure the flow of exhaust gas in both the forward direction of arrow F and the reverse direction of arrow R. The pressure differential between first tap 530 and second tap 534 in both directions of flow may be used to calculate the mass flow rate of the exhaust gas flowing through the EGR measurement device 510 regardless of the direction of flow. In addition, a correction factor may also be determined and used to enhance accuracy of the mass flow rate determined.

Figure 9:
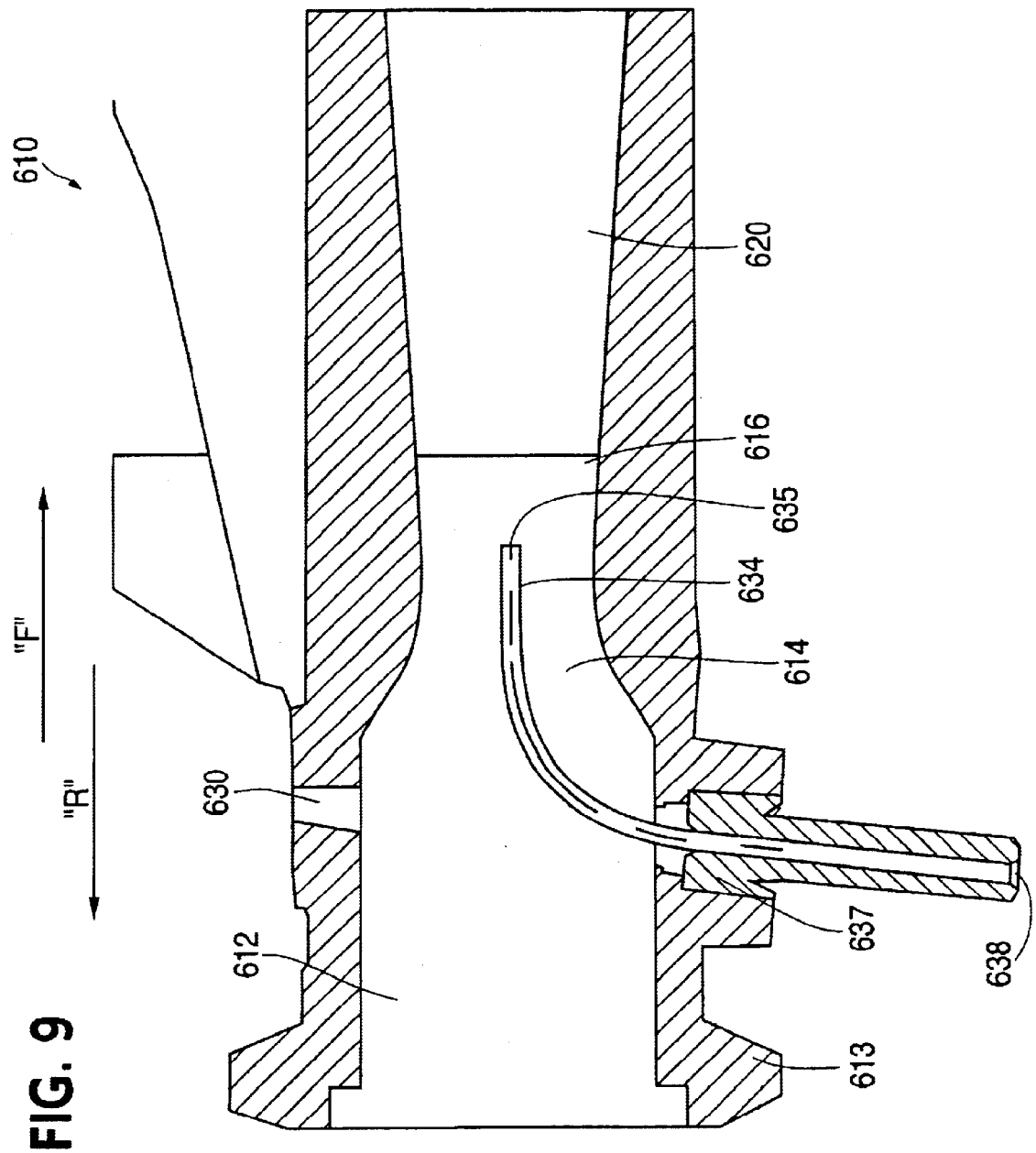
FIG. 9 is a cross-sectional side view of an EGR measurement device for an EGR system in accordance with another embodiment of the present invention that utilizes a pitot.

FIG. 9 is a cross-sectional side view of an EGR measurement device 610 for an EGR system in accordance with still another embodiment of the present invention. As shown, the EGR measurement device 610 includes an exhaust gas inlet section 612, a convergent cone section 614, and a diffuser section 620, the convergent cone section 614 being frusta-conically shaped with a throat portion 616. The present embodiment of the EGR measurement device 610 includes a first tap 630 that is in fluidic communication with the exhaust gas inlet section 612 to provide pressure of the exhaust gas in the exhaust gas inlet section 612. In addition, in contrast to the previously described embodiments, the EGR measurement device 610 is provided with a pitot tube 634 instead of a second tap. The pitot tube 634 has an opening 635 positioned at substantially the center of the throat portion 616 to allow measurement of a second pressure indicative of pressure of the exhaust gas in the throat portion 616. In the present embodiment, the opening 635 of the pitot tube 634 is open in the forward direction of arrow F and is secured to the housing 613 via pitot housing 637. The pressure measurement may be obtained outside the EGR measurement device 610 via port 638 of the pitot housing 637.

When the exhaust gas to be recirculated is flowing in the forward direction of arrow F, the tap 630 allows the measurement of the pressure in the exhaust gas inlet section 612 approximating the total pressure. In addition, the pitot tube 634 allows the measurement of the pressure in the throat portion 616 which approximates the static pressure. When the flow direction of the exhaust gas being recirculated reverses to the direction of arrow R, the pressure in the exhaust gas inlet section 612 measured via the first tap 630 approximates the static pressure while the pressure at the throat portion 616 as measured via the pitot tube 634 approximates the total pressure.

Correspondingly, the pressure differential between the first tap 630 and the pitot tube 634 may be used with the Bernoulli or other appropriate equation to calculate the mass flow rate of the exhaust gas flowing through the EGR measurement device 610 in the forward direction of arrow F, or in the reverse direction of arrow R which closely approximates the actual mass flow rate in the respective forward and reverse directions. Again, a correction factor may be empirically determined and incorporated into the determination of mass flow rate as needed so that the mass flow rate may be more accurately determined.

As can be appreciated, the use of the pitot tube 634 eliminates the need for providing a second port or an extension portion over the second port that defines an alcove as described in the previous embodiments. In addition, the present embodiment also allows the exhaust gas inlet section 612, the convergent cone section 614, and the diffuser section 620 to be integrally formed together without intricate features that may increase cost of production.

FIG. 10 is a cross-sectional side view of an EGR measurement device 710 for an EGR system in accordance with yet another embodiment of the present invention that utilizes two pitots. As shown, the EGR measurement device 710 includes an exhaust gas inlet section 712, a convergent cone section 714, and a diffuser section 720, the convergent cone section 714 being frustaconically shaped with a throat portion 716. The exhaust gas inlet section 712, the convergent cone section 714, and the diffuser section 720, are integrally provided on the housing 711 thereby simplifying manufacturing of the EGR measurement device 710.

The present embodiment of the EGR measurement device 710 includes a first pitot tube 730 positioned at substantially center of the throat portion 716 of the convergent cone section 714, the first pitot tube 730 having an opening 731 fluidically open in the reverse direction of arrow R to allow measurement of a first pressure. The EGR measurement device 710 also includes a second pitot tube 734 positioned at substantially center of the throat portion 716, the second pitot tube 734 having an opening 735 fluidically open in the forward direction of arrow F to allow measurement of a second pressure. In the illustrated embodiment, the first pitot tube 730 and the second pitot tube 734 may be secured to one another in a back to back manner and provided on a pitot housing 737 which is secured to the housing 711.

In the present embodiment, the first and second pitot tubes 730 and 734 allow accurate measurement of exhaust gas flow when the exhaust gas flows in both the forward direction of arrow F and the reverse direction of arrow R. In particular, when the exhaust gas to be recirculated is flowing in the forward direction of arrow F, the pressure as measured by the first pitot tube 730 approximates the total pressure while the pressure as measured by the second pitot tube 734 approximates the static pressure. When the flow direction of the exhaust gas being recirculated reverses to the direction of arrow R, the pressure as measured by the first pitot tube 730 approximates the static pressure while the pressure as measured by the second pitot tube 734 approximates the total pressure. Extension tube 732 and 736 are provided in the pitot housing 737 which are in communication with the pitot tubes 730 and 734 respectively to allow the first and second pressures to be measured outside of the EGR measurement device 710 using a pressure sensor or the like (not shown).

Correspondingly, the pressure differential between the first pitot tube 730 and the second pitot tube 734 may be used with the Bernoulli or other appropriate equation to calculate the mass flow rate of the exhaust gas flowing through the EGR measurement device 710 in the forward direction of arrow F, or in the reverse direction of arrow R which approximates the actual mass flow rate in the respective forward and reverse directions. Because of the close proximity between the pitot tubes in this embodiment, an empirically determined correction factor is desirable so that the mass flow rate may be more accurately determined.

Figure 11A:
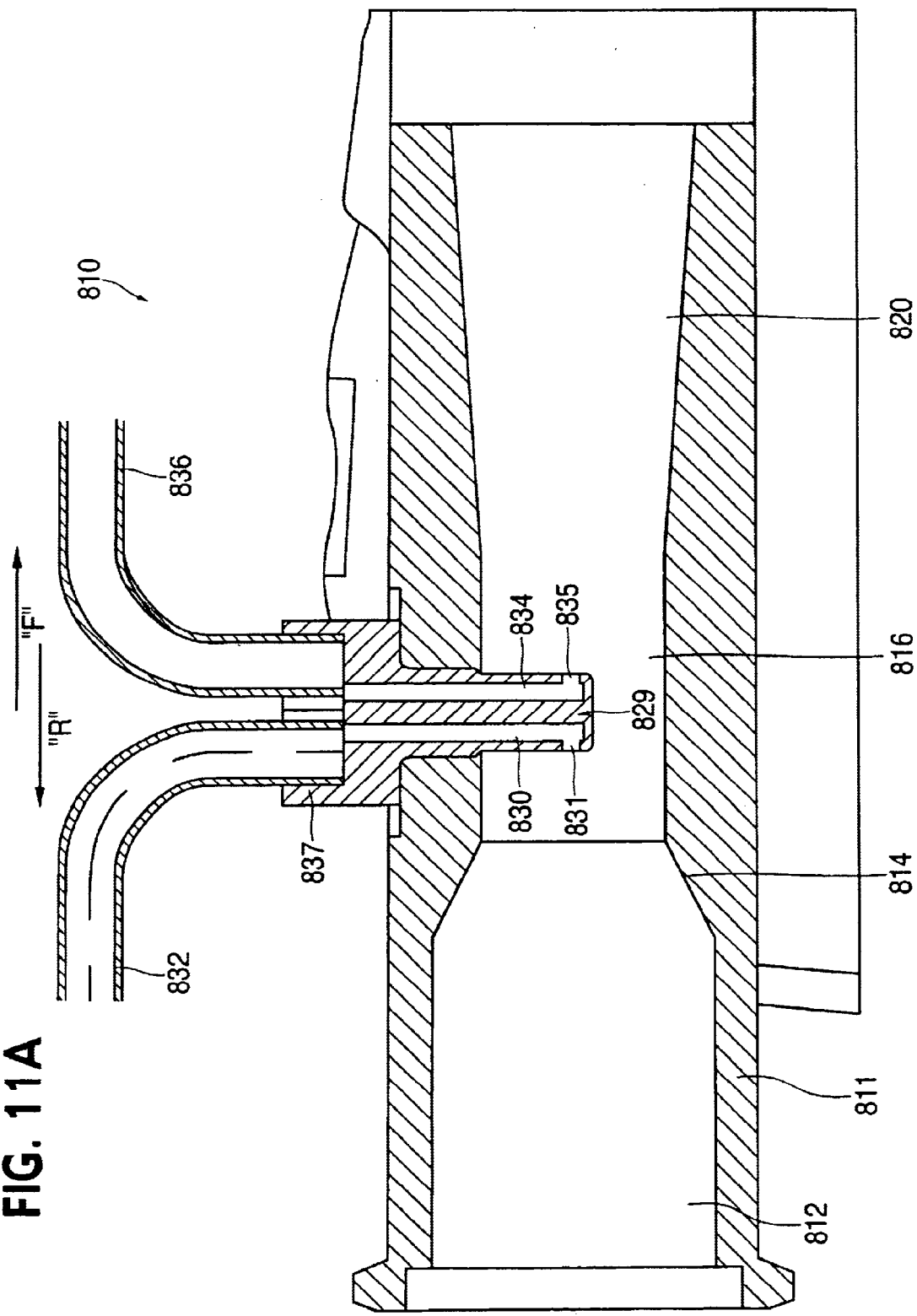
FIG. 11A is a cross-sectional side view of an EGR measurement device in accordance with yet another embodiment where two pitots are integrated into a blade.
Figure 11B:
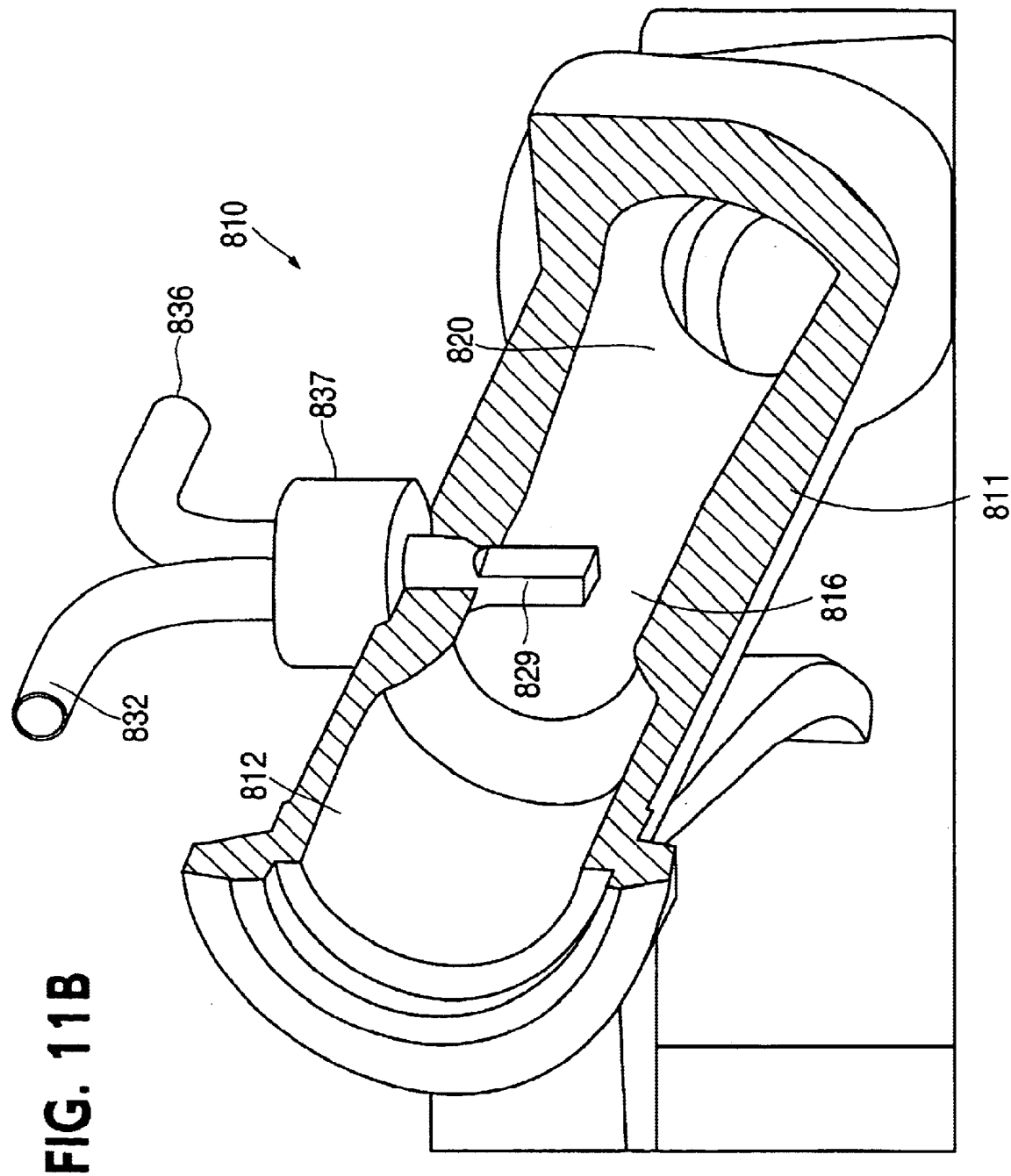
FIG. 11B is a partial cross-sectional perspective view of an EGR measurement device of FIG. 11A.

FIGS. 11A and 11B are partial cross-sectional views of an EGR measurement device 810 for an EGR system in accordance with yet another embodiment where two pitots are integrated together. Like the previous embodiment of FIG. 10, the. EGR measurement device 810 includes an exhaust gas inlet section 812, a convergent cone section 814, and a diffuser section 820, the convergent cone section 814 being frustaconically shaped with a throat portion 816, all of which are integrally provided on the housing 811 in the illustrated embodiment thereby simplifying manufacturing of the EGR measurement device 810.

The EGR measurement device 810 includes a blade 829 that is secured to the housing 811 via pitot housing 837 that allows measurement of pressure differential in the forward and reverse directions of exhaust gas flow so that mass flow rate may be determined. In particular, the blade 829 is positioned at substantially center of the throat portion 816 of the convergent cone section 814 and is provided with a first pitot tube 830 having an opening 831 fluidically open in the reverse direction of arrow R to allow measurement of a first pressure, and a second pitot tube 834 having an opening 835 fluidically open in the forward direction of arrow F to allow measurement of a second pressure.

Like the previous embodiment, the first pitot tube 830 and the second pitot tube 834 of the EGR measurement device 810 allows accurate measurement of exhaust gas flow when the exhaust gas flows in both the forward direction of arrow F and the reverse direction of arrow R. In this regard, the first and second pitot tubes 830 and 834 are connected to extension tubes 832 and 836 of the pitot housing 837 respectively to allow pressures to be measured outside of the EGR measurement device 810 using pressure sensors or the like (not shown). When the exhaust gas to be recirculated is flowing in the forward direction of arrow F, the pressure as measured by the first pitot tube 830 approximates the total pressure while the pressure as measured by the second pitot tube 834 approximates the static pressure. When the flow direction of the exhaust gas being recirculated reverses to the direction of arrow R, the pressure as measured by the first pitot tube 830 approximates the static pressure while the pressure as measured by the second pitot tube 834 approximates the total pressure.

Correspondingly, the pressure differential may be then determined by determining the difference in pressures of the first pitot tube 830 and the second pitot tube 834. By using the Bernoulli equation, the mass flow rate of the exhaust gas flowing through the EGR measurement device 810 in the forward direction of arrow F, or in the reverse direction of arrow R, may then be calculated which approximates the actual mass flow rate. Of course, the use of an empirically determined correction factor is desirable so that the mass flow rate may be more accurately determined.

It should be evident to one of ordinary skill in the art that the above embodiments as described relative to FIGS. 3 to 11B are merely provided as examples of the present invention and the present invention is not limited thereto. The structural details of the various implementations of the present invention are also provided as examples only and may be altered and modified. For example, whereas many embodiments discussed above are implemented with a housing having integral exhaust gas inlet, convergent cone section, and a diffuser section, these sections may be provided as separate parts or as components that may be secured to one another in any appropriate manner.

Figure 1:
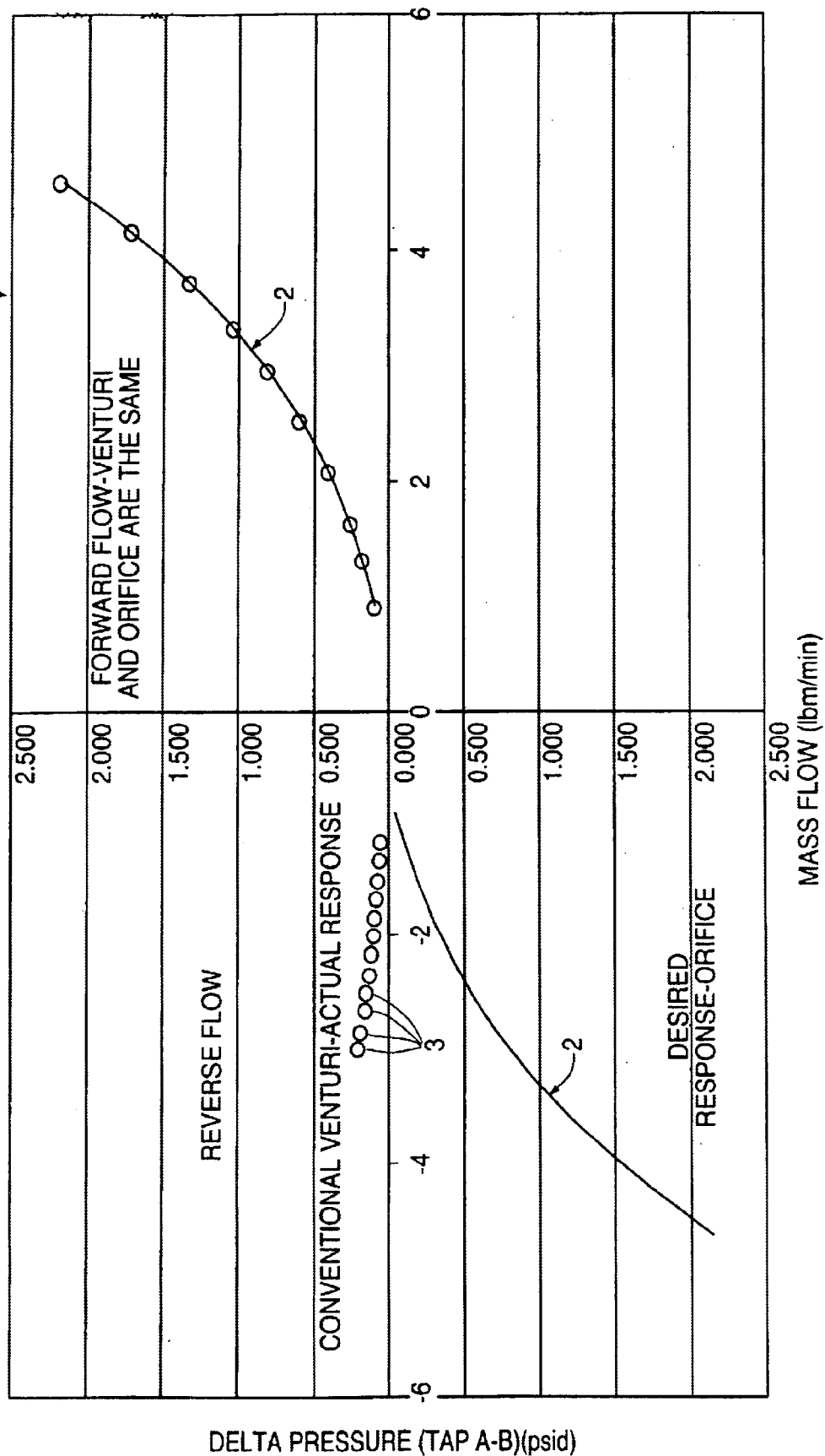
FIG. 1 is a graph showing the desired pressure response as attained by an orifice and the actual response provided by a conventional venturi.
Figure 12:
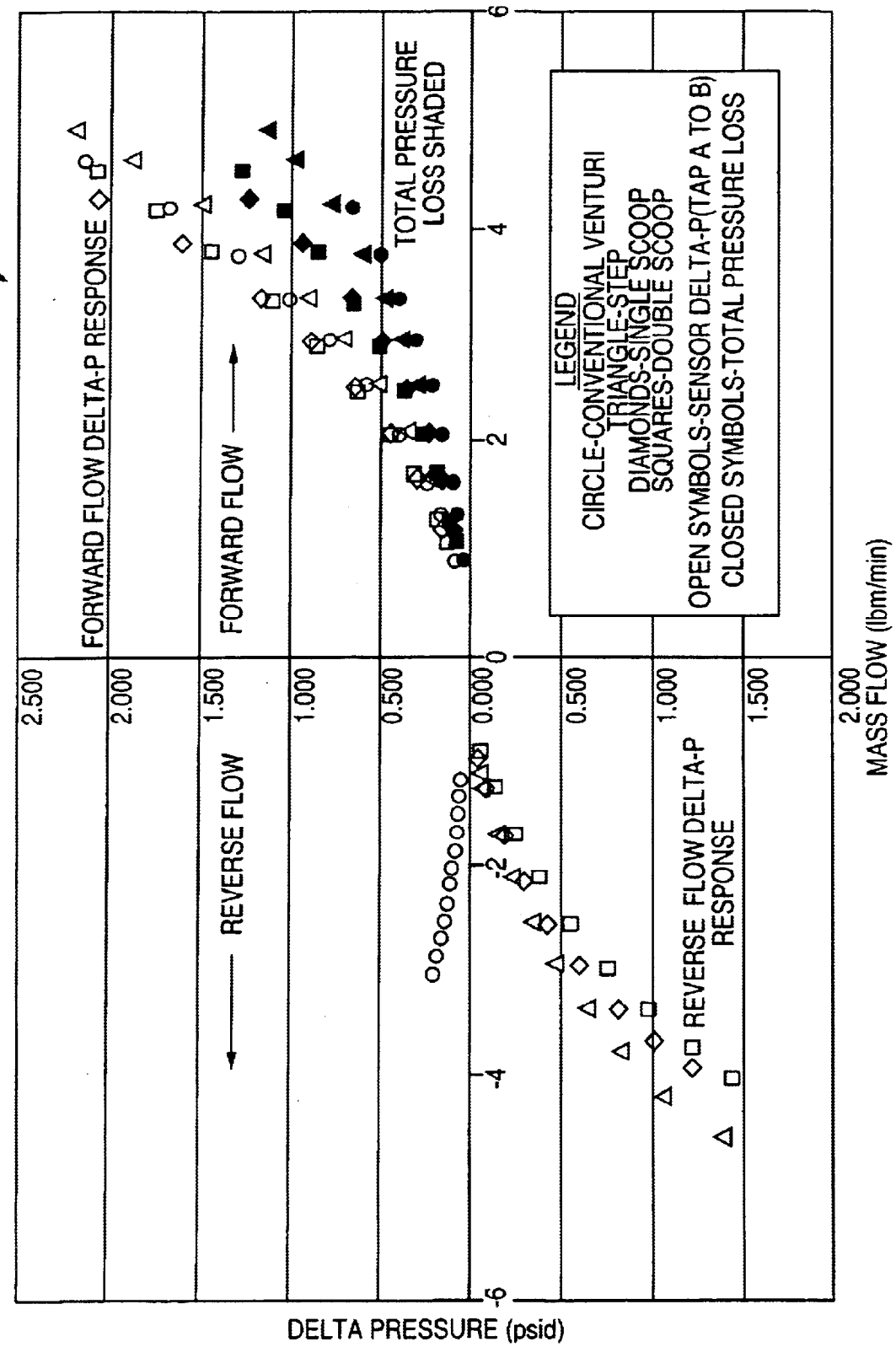
FIG. 12 is a graph showing the pressure response attained by the EGR measurement devices in accordance with various embodiments of the present invention having an extension portion, as compared to a conventional venturi.

FIG. 12 illustrates a graph 910 similar to that shown in FIG. 1 but showing the pressure response of several of the EGR measurement devices in accordance with various embodiments of the present invention having an extension portion as compared to a conventional venturi. As shown, the x-axis of the graph 910 indicates the mass flow in pound of mass per minute (lbm/min) while the y-axis of the graph 910 indicates the delta pressure, i.e. the pressure differential, in pounds per square inch (psid). The right half of the graph 910 where the mass flow values are positive indicates forward flow of the exhaust gas while the left half of the graph 910 where the mass flow values are negative indicates reverse flow of the exhaust gas. As indicated in the Legend of graph 910, the performance data of a conventional venturi is shown as series of unfilled circle data points. As shown, in the forward flow direction, the performance of venturis closely corresponds to the performance of the orifice. However, as previously described relative to FIG. 1, venturis do not produce the correct pressure differential response when the flow reverses direction.

The unfilled triangle data points on graph 910 indicate the performance of EGR measurement device 10 shown in FIG. 3 discussed above which is provided with an extension portion extending substantially over the second tap. The unfilled diamond data points indicate the performance of EGR measurement device 310 shown in FIGS. 6A to 6C discussed above which is provided with an insert having an extension portion extending substantially over the second tap. Lastly, the unfilled square data points indicate the performance of EGR measurement device 410 shown in FIGS. 7A and 7B discussed above which is provided with an insert having extension portions extending substantially over both the first tap and the second tap. The shaded data points provide total pressure loss for each of the circle, triangle, diamond, and square data points corresponding to the various embodiments of the EGR measurement devices noted. As shown, the total pressure loss is similar to that of the conventional venturi.

As evident from careful examination of these data points in graph 910, for the same mass flow, the pressure differential (delta-P) is similar in magnitude in the reverse direction as it is in the forward direction with the exception of the changes in sign for each of these embodiments. Therefore, these embodiments of the present invention provide much more accurate pressure differential output when the exhaust gas flows in the reverse direction as compared to conventional venturis. This allows the mass flow rate to be determined even when the exhaust gas flows in the reverse direction which was not possible using a conventional venturi.

Figure 13:
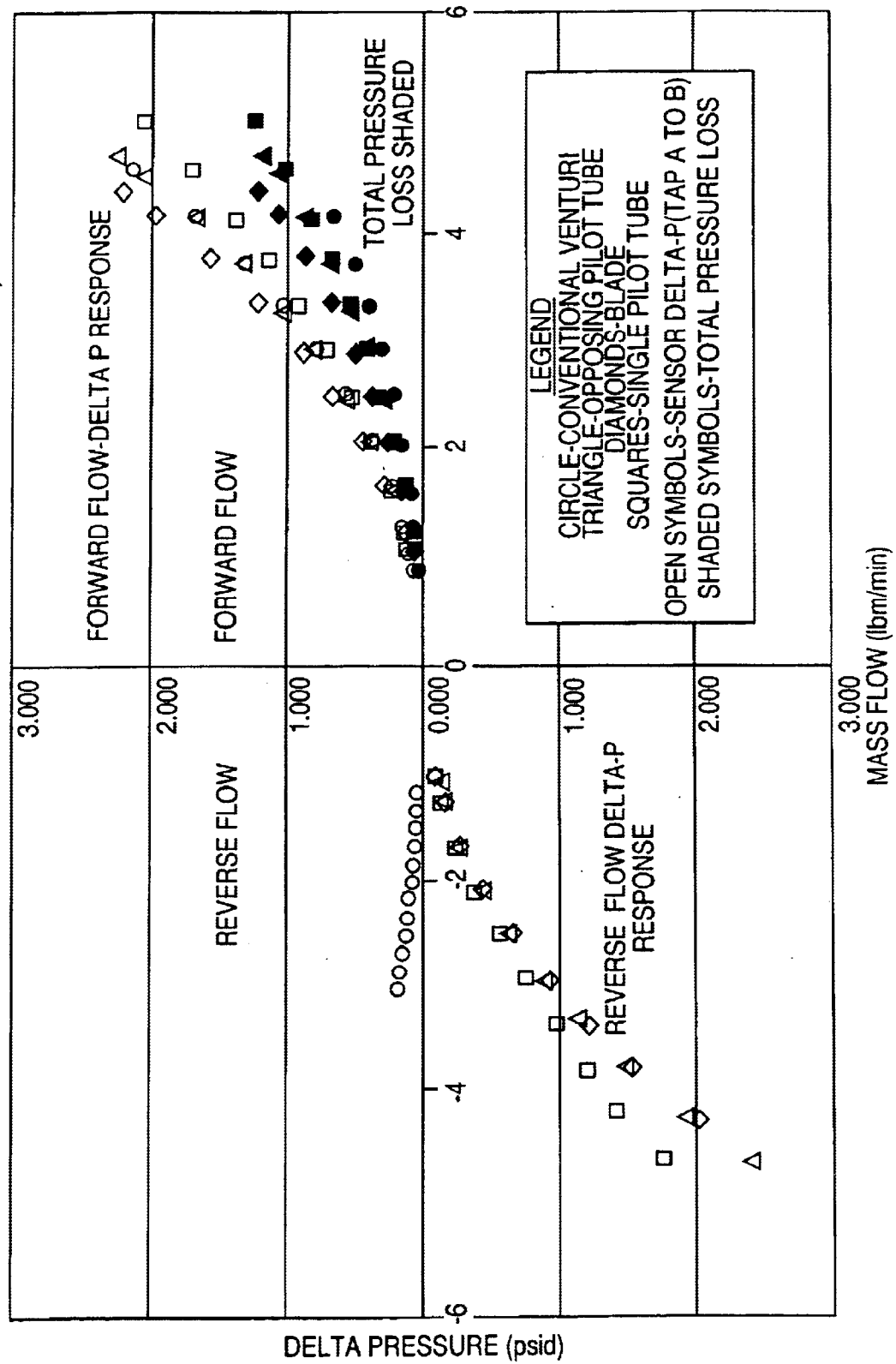
FIG. 13 is a graph showing the pressure response attained by the EGR measurement devices in accordance with various embodiments of the present invention using one or more pitot tubes as compared to a conventional venturi.

FIG. 13 illustrates a graph 920 similar to that of FIG. 12 but showing the pressure response of several of the EGR measurement devices in accordance with the other embodiments of the present invention utilizing one or more pitot tubes as compared to a conventional venturi. As indicated in the Legend of graph 920, the performance data of a conventional venturi is again shown as series of unfilled circle data points. The unfilled triangle data points on graph 920 indicate the performance of EGR measurement device 710 shown in FIG. 10 discussed above which is provided with two opposing pitot tubes. The unfilled diamond data points indicate the performance of EGR measurement device 810 shown in FIGS. 11A and 11B discussed above which is provided with a blade having two opposing pitot tubes. Lastly, the unfilled square data points indicate the performance of EGR measurement device 610 shown in FIG. 9 discussed above which is provided with a first tap and a pitot tube. The shaded data points provide total pressure loss for each of the circle, triangle, diamond, and square data points corresponding to the various embodiments of the EGR measurement devices noted. As shown, the total pressure loss is similar to that of the conventional venturi.

As evident from careful examination of these data points in graph 910, for the same mass flow, the pressure differential (delta-P) is similar in magnitude in the reverse direction as it is in the forward direction with the exception of the changes in sign for each of these embodiments as well. Therefore, the various embodiments of the present invention utilizing one or more pitot tubes provides much more accurate pressure differential output when the exhaust gas flows in the reverse direction as compared to conventional venturis. This again allows the mass flow rate to be determined even when the exhaust gas flows in the reverse direction which was not possible using a conventional venturi.

FIG. 14 shows graph 930 that illustrates the symmetry and loss performance of the EGR measurement devices for an EGR system in accordance with various embodiments of the present invention as applied to an example engine. As shown, the x-axis indicates the symmetry parameter while the y-axis indicates the loss parameter. In particular, the symmetry parameter quantifies the symmetry performance of an EGR measurement device by normalizing the reverse total-to-static pressure. A perfectly symmetric EGR measurement device will thus, have a symmetry parameter of unity, i.e. one. The loss parameter quantifies the flow losses by normalizing the total pressure loss by the total-to-static pressure in the forward flow direction, and thus, represents the percent of the total-to-static pressure that was lost. A loss parameter value low as possible is desirable but losses of a conventional venturi would represent a realistic minimum loss.

As can be seen in graph 930, the orifice provides good symmetry parameter performance that is close to unity but has a very high loss parameter as noted relative to FIGS. 1, 12 and 13. In addition, conventional venturi provides good loss parameter performance but exhibits very poor symmetry parameter performance. The remaining performance data points plot the performance of various embodiments of the EGR measurement device in accordance with the present invention.

In the above regard, on the graph 930, the performance data point associated with the EGR measurement device 10 of FIG. 3 is indicated as "Stepped", the data point associated with the EGR measurement device 310 of FIG. 6A is indicated as "Single Scoop", and the data point associated with the EGR measurement device 410 of FIG. 7A is indicated as "Double Scoop". Thus, as can be appreciated in review of the graph 930, the embodiments of the present invention in which an extension portion extends above the second tap provides significantly better symmetry parameter performance that is closer to unity than the conventional venturi. In addition, these embodiments also reduce the loss parameter as compared to a conventional orifice. Furthermore, the EGR measurement device 10 of FIG. 3 indicated as "Stepped" and the EGR measurement device 310 of FIG. 6A indicated as "Single Scoop" provide better performance overall than the EGR measurement device 410 of FIG. 7A indicated as "Double Scoop" as applied in the present example engine.

Moreover, graph 930 of FIG. 14 also shows various embodiments of the EGR measurement device in accordance with the present invention which are implemented using one or more pitot tubes. In particular, the performance data point associated with the EGR measurement device 610 of FIG. 9 is indicated as "Static Probe", the data point associated with the EGR measurement device 710 of FIG. 10 is indicated as "Dual Probe", and the data point associated with the EGR measurement device 810 of FIGS. 11A and 11B is indicated as "Blade". As can be readily appreciated in review of the graph 930, these embodiments of the present invention which utilize one or more pitot tubes provides significantly better symmetry parameter performance that is closer to unity than the conventional venturi, while also significantly reducing the loss parameter as compared to a conventional orifice.

It should be appreciated that graph 930 of FIG. 14 illustrates performance of various embodiments of the present invention as applied to one example internal combustion engine which specifies the flow, dimensional, and other relevant parameters for the EGR measurement device. Of course, such parameters change with different internal combustion engines and engine applications. Hence, the performance data points as plotted in graph 930 of FIG. 14 should be understood as providing merely example performance parameters of an example engine and not as universal performance data points applicable to all engines and EGR measurement devices. As flow, dimensional, and other parameters change for any given application, the actual performance of the EGR measurement devices in accordance with the various embodiments will also likely change.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. An exhaust gas recirculation (EGR) measurement device for recirculating at least a portion of exhaust gas of an internal combustion engine, said at least a portion of exhaust gas flowing in said EGR system in a forward direction to an intake of the internal combustion engine, said EGR system comprising:

an exhaust gas inlet section having a substantially cylindrical shape;

a convergent cone section connected to said exhaust gas inlet section, said convergent cone section including a cone inlet, a throat portion, and a cone outlet that is radially smaller than said cone inlet;

a diffuser section connected to said cone outlet, said diffuser section including a diffuser inlet, a divergent conical portion, and a diffuser outlet that is radially larger than said diffuser inlet; and a means for providing accurate measurement of exhaust gas flow in said EGR system when said exhaust gas flows in a reverse direction that is opposite to said forward direction.

2. The EGR measurement device of claim 1, wherein said exhaust flow is pulsitile.

3. The EGR measurement device of claim 1, further comprising a first tap in fluidic communication with said exhaust gas inlet section to allow measurement of a first pressure indicative of pressure of said exhaust gas in said exhaust gas inlet section, and a second tap positioned downstream of said first tap to allow measurement of a second pressure indicative of pressure of said exhaust gas downstream of said first tap.

4. The EGR measurement device of claim 3, wherein said means further provides accurate measurement of exhaust gas flow when said exhaust gas flows in said forward direction based on pressure difference between said first pressure and said second pressure.

5. The EGR measurement device of claim 3, wherein said means provides accurate measurement of exhaust gas flow when said exhaust gas flows in said reverse direction based on said first pressure and said second pressure.

6. The EGR measurement device of claim 5, wherein said means provides accurate measurement of exhaust gas flow when said exhaust gas flows in said reverse direction based at least on a pressure difference between said first pressure and said second pressure.

7. The EGR measurement device of claim 6, wherein said means includes an extension portion that extends substantially over said second tap.

8. The EGR measurement device of claim 7, wherein said extension portion defines an alcove that is fluidically open in said forward direction.

9. The EGR measurement device of claim 8, wherein said alcove is fluidically open to said throat portion of said convergent cone section.

10. The EGR measurement device of claim 9, wherein said alcove is further fluidically open to said divergent conical portion of said diffuser section.

11. The EGR measurement device of claim 8, wherein said alcove is fluidically open to said divergent conical portion of said diffuser section.

12. The EGR measurement device of claim 7, wherein said exhaust gas inlet section and said convergent cone section are formed together as an integrated component that is secured to said diffuser section, said throat portion of said convergent cone section defining said extension portion substantially extending over said second tap.

13. The EGR measurement device of claim 12, wherein said extension portion defines an annular alcove that is fluidically open in said forward direction.

14. The EGR measurement device of claim 13, wherein said diffuser includes a substantially straight tubular portion upstream in the forward direction of said divergent conical portion.

15. The EGR measurement device of claim 7, wherein said convergent cone section is formed as an insert, said throat portion of said convergent cone section defining said extension portion substantially extending over said second tap.

16. The EGR measurement device of claim 15, wherein said throat portion includes an indentation that defines said extension portion substantially extending over said second tap.

17. The EGR measurement device of claim 7, wherein said convergent cone section is formed as an insert, said throat portion of said convergent cone section having a first indentation that defines said extension portion substantially extending over said first tap.

18. The EGR measurement device of claim 17, wherein said throat portion further includes a second indentation that defines a second extension portion that substantially extends over said second tap.

19. The EGR measurement device of claim 17, wherein said second extension portion defines a second alcove.

20. The EGR measurement device of claim 1, wherein said means comprises a first tap in fluidic communication with said exhaust gas inlet section to allow measurement of a first pressure indicative of pressure of said exhaust gas in said exhaust gas inlet section, and a pitot tube having an opening positioned at substantially center of said throat portion of said convergent cone section to allow measurement of a second pressure indicative of pressure of said exhaust gas in said throat portion of said convergent cone section.

21. The EGR measurement device of claim 20, wherein said opening of said pitot tube is fluidically open in said forward direction.

22. The EGR measurement device of claim 21, wherein said means provides accurate measurement of exhaust gas flow when said exhaust gas flows in said reverse direction based on said first pressure and said second pressure.

23. The EGR measurement device of claim 1, wherein said means comprises a first pitot tube positioned at substantially center of said throat portion of said convergent cone section, said first pitot tube having an opening fluidically open in said reverse direction to allow measurement of a first pressure.

24. The EGR measurement device of claim 23, wherein said means further comprises a second pitot tube positioned at substantially center of said throat portion of said convergent cone section, said second pitot tube having an opening fluidically open in said forward direction to allow measurement of a second pressure.

25. The EGR measurement device of claim 24, wherein said first pitot tube and said second pitot tube are secured to one another.

26. The EGR measurement device of claim 24, wherein said first pitot tube and said second pitot tube are provided on a blade positioned at substantially center of said throat portion of said convergent cone section.

27. The EGR measurement device of claim 26, wherein said first pressure is at least one of static pressure and total pressure, and said second pressure is other of said static pressure and total pressure.

28. The EGR measurement device of claim 26, wherein said means provides accurate measurement of exhaust gas flow when said exhaust gas flows in said reverse direction based on said first pressure and said second pressure.

29. An exhaust gas recirculation (EGR) measurement device for recirculating at least a portion of exhaust gas of an internal combustion engine, said at least a portion of exhaust gas flowing in a forward direction in said EGR measurement device to an intake of the internal combustion engine, and a reverse direction opposite to said forward direction, said EGR measurement device comprising:

an exhaust gas inlet section having a substantially cylindrical shape;

a first tap in fluidic communication with said exhaust gas inlet section to allow measurement of a first pressure indicative of pressure of said exhaust gas in said exhaust gas inlet section;

a convergent cone section connected to said exhaust gas inlet section, said convergent cone section including a cone inlet, a throat portion, and a cone outlet that is radially smaller than said cone inlet;

a second tap positioned downstream of said first tap to allow measurement of a second pressure indicative of pressure of said exhaust gas downstream of said first tap;

a diffuser section connected to said cone outlet, said diffuser section including a diffuser inlet, and a diffuser outlet that is radially larger than said diffuser inlet; and an extension portion that extends substantially over said second tap to define an alcove that is fluidically open in said forward direction, said alcove allowing accurate measurement of exhaust gas flow based on said first pressure and said second pressure when said exhaust gas flows in said reverse direction.

30. The EGR measurement device of claim 29, wherein said alcove is fluidically open to said throat portion of said convergent cone section.

31. The EGR measurement device of claim 29, wherein said alcove is fluidically open to said divergent conical portion of said diffuser section.

32. The EGR measurement device of claim 29, wherein said convergent cone section is formed as an insert, said throat portion of said convergent cone section defining said extension portion substantially extending over said second tap.

33. The EGR measurement device of claim 32, wherein said throat portion has an indentation that defines said extension portion substantially extending over said second tap.

34. An exhaust gas recirculation (EGR) measurement device for recirculating at least a portion of exhaust gas of an internal combustion engine, said at least a portion of exhaust gas flowing in a forward direction in said EGR measurement device to an intake of the internal combustion engine, and a reverse direction opposite to said forward direction, said EGR measurement device comprising:

an exhaust gas inlet section having a substantially cylindrical shape;

a first tap in fluidic communication with said exhaust gas inlet section to allow measurement of a first pressure indicative of pressure of said exhaust gas in said exhaust gas inlet section;

a convergent cone section connected to said exhaust gas inlet section, said convergent cone section including a cone inlet, a throat portion, and a cone outlet that is radially smaller than said cone inlet;

a pitot tube positioned at substantially center of said throat portion of said convergent cone section, said pitot tube having an opening fluidically open in said forward direction to allow measurement of a second pressure indicative of pressure of said exhaust gas in said throat portion of said convergent cone section, said pitot tube allowing accurate measurement of exhaust gas flow based on said first pressure and said second pressure when said exhaust gas flows in said reverse direction; and a diffuser section connected to said cone outlet, said diffuser section including a diffuser inlet, a divergent conical portion, and a diffuser outlet that is radially larger than said diffuser inlet.

35. An exhaust gas recirculation (EGR) measurement device for recirculating at least a portion of exhaust gas of an internal combustion engine, said at least a portion of exhaust gas flowing in a forward direction in said EGR measurement device to an intake of the internal combustion engine, and a reverse direction opposite to said forward direction, said EGR measurement device comprising:

an exhaust gas inlet section having a substantially cylindrical shape;

a convergent cone section connected to said exhaust gas inlet section, said convergent cone section including a cone inlet, a throat portion, and a cone outlet that is radially smaller than said cone inlet;

a first pitot tube positioned at substantially center of said throat portion of said convergent cone section, said first pitot tube having an opening fluidically open in said reverse direction to allow measurement of a first pressure;

second pitot tube positioned at substantially center of said throat portion of said convergent cone section, said second pitot tube having an opening fluidically open in said forward direction to allow measurement of a second pressure to allow accurate measurement of exhaust gas flow based on said first pressure and said second pressure when said exhaust gas flows in said reverse direction; and a diffuser section connected to said cone outlet, said diffuser section including a diffuser inlet, a divergent conical portion, and a diffuser outlet that is radially larger than said diffuser inlet.

36. The EGR measurement device of claim 35, wherein said first pitot tube and said second pitot tube are secured to one another.

37. The EGR measurement device of claim 35, wherein said first pitot tube and said second pitot tube are provided on a blade positioned at substantially center of said throat portion of said convergent cone section.

38. The EGR measurement device of claim 35, wherein said first pressure is at least one of static pressure and total pressure, and said second pressure is other of said static pressure and total pressure.

* * * * *